United States Patent
Pencer et al.

(10) Patent No.: US 11,183,311 B2
(45) Date of Patent: Nov. 23, 2021

(54) FUEL CHANNEL ASSEMBLY AND FUEL BUNDLE FOR A NUCLEAR REACTOR

(71) Applicant: ATOMIC ENERGY OF CANADA LIMITED, Chalk River (CA)

(72) Inventors: Jeremy Pencer, Deep River (CA); Blair Bromley, Deep River (CA); Armando Nava-Dominguez, Deep River (CA)

(73) Assignee: Atomic Energy of Canada Limited / Energie Atomique Du Canada Limitee, Chalk River (CA)

( * ) Notice: Subject to any disclaimer, the term of this patent is extended or adjusted under 35 U.S.C. 154(b) by 618 days.

(21) Appl. No.: 15/966,552

(22) Filed: Apr. 30, 2018

(65) Prior Publication Data
US 2018/0301230 A1    Oct. 18, 2018

Related U.S. Application Data

(63) Continuation of application No. 14/420,999, filed as application No. PCT/CA2013/050447 on Jun. 13, 2013, now abandoned.
(Continued)

(51) Int. Cl.
*G21C 3/328* (2006.01)
*G21C 3/322* (2006.01)
(Continued)

(52) U.S. Cl.
CPC ............ *G21C 3/328* (2013.01); *G21C 1/20* (2013.01); *G21C 3/322* (2013.01); *G21C 3/324* (2013.01);
(Continued)

(58) Field of Classification Search
CPC ........ G21C 3/328; G21C 3/324; G21C 3/322; G21C 1/20; G21C 15/06; G21C 5/12; Y02E 30/30
See application file for complete search history.

(56) References Cited

U.S. PATENT DOCUMENTS 3,053,746 A    9/1962  Challender et al.
3,071,527 A    1/1963  Gale
(Continued)

FOREIGN PATENT DOCUMENTS

CA         674773 A      11/1963
CA       2174983 A1      10/1997
(Continued)

OTHER PUBLICATIONS

Buongiorno et al.. Study of Solid Moderators for the Thermal-Spectrum Supercritical Water-Cooled Reactor, Nuclear Technology vol. 153, Mar. 2006, pp. 282-303.
(Continued)

*Primary Examiner* — Darlene M Ritchie
(74) *Attorney, Agent, or Firm* — Kevin Shipley; Fogler, Rubinoff LLP

(57) ABSTRACT

A fuel assembly for a pressure-tube nuclear reactor includes a fuel channel assembly. The fuel channel assembly has an outer conduit and an inner conduit received within the outer conduit. The conduits define an annular fuel bundle chamber for receiving a flow of a coolant in one direction. The inner conduit includes a central flow passage for receiving a flow of the coolant in an opposite direction. A fuel bundle positioned within the fuel bundle chamber consists of fuel elements arranged to form an inner ring surrounding the inner conduit, and an outer ring surrounding the inner ring. The coolant may be light water, and geometries of the fuel assembly may be selected so moderation by the volume of
(Continued)

coolant promotes generally uniform power distribution in the fuel elements.

19 Claims, 16 Drawing Sheets

Related U.S. Application Data

(60) Provisional application No. 61/659,219, filed on Jun. 13, 2012, provisional application No. 61/659,229, filed on Jun. 13, 2012, provisional application No. 61/731,853, filed on Nov. 30, 2012.

(51) Int. Cl.
    *G21C 1/20* (2006.01)
    *G21C 15/06* (2006.01)
    *G21C 3/324* (2006.01)
    *G21C 5/12* (2006.01)

(52) U.S. Cl.
    CPC .............. *G21C 15/06* (2013.01); *G21C 5/12* (2013.01); *Y02E 30/30* (2013.01)

(56) References Cited

U.S. PATENT DOCUMENTS

| | | | |
|---|---|---|---|
| 3,104,219 A * | 9/1963 | Sulzer | G21C 3/326 376/435 |
| 3,128,234 A | 4/1964 | Cage et al. | |
| 3,179,571 A | 4/1965 | Hans-Peter et al. | |
| 3,240,678 A | 3/1966 | Hemmerle | |
| 3,318,777 A | 5/1967 | De Kervenoael | |
| 3,342,689 A | 9/1967 | Gaudez et al. | |
| 3,350,273 A | 10/1967 | Van Der Laken | |
| 3,365,370 A | 1/1968 | Helbling | |
| 3,381,777 A | 5/1968 | Filchy | |
| 3,403,075 A * | 9/1968 | Fiebelmann | G21C 15/02 376/367 |
| 3,453,178 A | 7/1969 | Winkler et al. | |
| 3,687,805 A | 8/1972 | Desbois | |
| 3,801,443 A | 4/1974 | Muramatsu et al. | |
| 4,046,627 A | 9/1977 | Middleton | |
| 4,056,440 A | 11/1977 | Macbeth | |
| 4,094,737 A | 6/1978 | Greischel | |
| 4,131,511 A * | 12/1978 | Mordarski et al. | G21C 19/14 376/267 |
| 4,259,993 A | 4/1981 | Scholz | |
| 4,305,458 A | 12/1981 | Jogand | |
| 4,726,926 A | 2/1988 | Patterson et al. | |
| 4,789,520 A * | 12/1988 | Morimoto et al. | G21C 3/328 376/426 |
| 4,795,608 A | 1/1989 | Nylund | |
| 4,824,804 A | 4/1989 | Cheng | |
| 4,826,653 A | 5/1989 | Nylund et al. | |
| 4,842,804 A | 6/1989 | Hopkins | |
| 4,911,880 A | 3/1990 | Kasai et al. | |
| 5,154,880 A | 10/1992 | Oosterkamp | |
| 5,243,636 A * | 9/1993 | Zerressen | G21C 3/322 376/444 |
| 5,410,578 A * | 4/1995 | Walton | G21C 3/322 376/426 |
| 5,432,829 A * | 7/1995 | Aoyama et al. | G21C 3/328 376/426 |
| 5,442,668 A | 8/1995 | Neil et al. | |
| 5,493,590 A * | 2/1996 | Sollychin | G21C 3/322 376/401 |
| 5,528,641 A * | 6/1996 | Takeuchi | G21C 3/322 376/444 |
| 5,640,434 A | 6/1997 | Rottenberg | |
| 5,892,806 A | 4/1999 | Scott | |
| 6,053,652 A | 4/2000 | Deaver et al. | |
| 6,236,701 B1 | 5/2001 | Nylund | |
| 6,526,115 B2 | 2/2003 | Kataoka et al. | |
| 3,582,294 A1 * | 2/2009 | Theissen | G21C 3/322 376/434 |
| 2009/0034676 A1 * | 2/2009 | Elkins | G21C 3/322 376/434 |
| 2011/0311015 A1 | 12/2011 | Ziaei et al. | |
| 2013/0089174 A1 | 4/2013 | Diamond et al. | |
| 2013/0121452 A1 * | 5/2013 | Bodner | G21C 19/14 376/267 |
| 2013/0322591 A1 * | 12/2013 | Bashkirtsev | G21C 3/322 376/426 |
| 2015/0155059 A1 | 6/2015 | Yetisir et al. | |
| 2015/0155060 A1 | 6/2015 | Yetisir et al. | |
| 2015/0206604 A1 | 7/2015 | Pencer et al. | |
| 2017/0316839 A1 | 11/2017 | Bodner et al. | |
| 2018/0301230 A1 | 10/2018 | Pencer et al. | |

FOREIGN PATENT DOCUMENTS

| | | | |
|---|---|---|---|
| CA | 2097412 C | 8/2005 | |
| CA | 2796439 A1 | 10/2011 | |
| CA | 2796487 A1 | 10/2011 | |
| CA | 2876521 A1 | 12/2013 | |
| CA | 2876524 A1 | 12/2013 | |
| CA | 2881784 A1 | 12/2013 | |
| DE | 3036933 | 5/1982 | |
| DE | 3215122 C1 | 11/1983 | |
| EP | 0196655 A1 | 10/1986 | |
| EP | 0240894 B1 | 2/1991 | |
| EP | 0282600 B1 | 1/1992 | |
| EP | 0552790 A1 | 9/1993 | |
| EP | 0798745 A1 | 10/1997 | |
| EP | 2551512 A1 | 2/2013 | |
| EP | 2561513 A1 | 2/2013 | |
| EP | 2862175 A1 | 4/2015 | |
| EP | 2864987 B1 | 9/2017 | |
| EP | 2862178 B1 | 11/2017 | |
| GB | 803701 A | 10/1958 | |
| GB | 820579 A | 9/1959 | |
| GB | 1528267 A | 10/1978 | |
| JP | S63309894 A | 12/1988 | |
| JP | 36483187 A | 3/1989 | |
| JP | 2010197 | 1/1990 | |
| JP | 4059596 B2 | 3/2008 | |
| WO | 9741565 A1 | 11/1997 | |
| WO | WO-9741565 A1 * | 11/1997 | ............... G21C 1/20 |
| WO | 2011130821 A1 | 10/2011 | |
| WO | 2011130841 A1 | 10/2011 | |
| WO | 2013185229 A1 | 12/2013 | |
| WO | 2013185230 A1 | 12/2013 | |
| WO | 2013185232 A1 | 12/2013 | |

OTHER PUBLICATIONS

Zhao et al., Code Design Study of A Supercritical Light Water Reactor with Double Row Fuel Rods, The 3rd China-Canada Joint Workshop on Supercritical-Water-Cooled Reactors, CCSC-2012.
Chow et al., Conceptual Fuel Channel Designs far CANDU-SCWR. Nuclear Engineering and Technology, vol. 40, No. 2, 2007.
Dimitrov, "ACR Fuel Channel Design", Atomic Energy of Canada Limited, 2002.
Hofmeister et al., "Fuel assembly design study for a reactor with supercritical water". Nuclear Engineering and Design, Germany, 2007.
International Preliminary Search Report-Issued on PCT/CA2011/000165.
International Preliminary Search Report Issued on PCT/CA2011/000459.
International Preliminary Search Report Issued on PCT/CA2013/050446.
International Preliminary Search Report Issued on PCT/CA2013/050447.
International Search Report Issued on PCT/CA2011/000165.
International Search Report Issued on PCT/CA2013/050446.
International Search Report Issued on PCT/CA2013/050447.
Lamarsh and Baratta, Introcuction to Nuclear Engineering, 3rd edition, 2001, pp. 163-168.

(56) References Cited

OTHER PUBLICATIONS

Mokry et al., "Development of supercritical water heat-transfer correlation for vertical bare tubes", Nuclear Engineering and Design, 2010.
Pencer et al., Axial and Radial Graded Enrichment Options for the Canadian SCWR, The 3rd China-Canada Joint Workshop on Sopercritical-Water-Cooled Reactors, CCSC-2012, Apr. 18-20, 2612, Xi'an, China.
Roshd et al.. Nuclear Fuel Bundie Design with Reduced Void Effect, ANS-Transactions 26, 1997, pp. 603-604.
Spinks, N.J., "CANDU Nuclear Power Reactors" Thermopedia, Feb. 8, 2011, DOI: 10.1615/AtoX.c.candu_nuclear_power_reactors (cited in the interview summary Sep. 1, 2015).
Yetisir et al, SuperSafe Reactor@ (SSSR): A Supercritical Water-Cooled Small Reactor. 2nd International Technical Meeting on Smail Reactors, Nov. 7-9, 2012, Ottawa, Ontario, Canada.
Non-Final Rejection dated Mar. 24, 2017 in respect of U.S. Appl. No. 14/420,999.
Boczar P G et al, "A low-void reactivity candu fuel bundle" 1992 Toronto, ON, Canadian Nuclear Society, vol. 10. pp. 49-55.
European Search Report for EP 97 30 2075 dated Jun. 26, 1997.
Supplementary European Search Report and Annex to the European Search Report on European Patent Application No. EP 13 80 3781.7, dated Feb. 5, 2016 (9 pages).
Supplementary European Search Report and Annex to the European Search Report on European Patent Application No. EP 13 80 3986.2, dated Feb. 3, 2016 (10 pages).
Supplementary European Search Report and Annex to the European Search Report on European Patent Application No. EP 13 80 4526.5, dated Feb. 24, 2016 (10 pages).
Torgerson et al: "CANDU technology for Generation III+ and IV reactors", Nuclear Engineering and Design, Amsterdam, NL, vol. 236, No. 14-16, Aug. 1, 2006 (Aug. 1, 2006), pp. 1565-1572, XP005512872, ISSN: 0029-5493, DOI: 10.1016/J.NUCENGDES. 2006.04.020.
ACR-700 Technical Outline AECL Revision 3 Mar. 21, 2004 <https://adamswebsearch2.nrc.gov/webSearch2/main.jsp? AccessionNumber=ML041350424>.
AECL Nuclear Review, vol. 1, No. 2 Dec. 2012.

Extended European Search Report, issued in respect of European Patent Application No. 17198778.7.
International Search Report Issued on PCT/CA2011/0004591.
M. Yetisir, M. Gaudet and D. Rhodes, 2013, "Development and Integration of Canadian SCWR Concept with Counter-Flow Fuel Assembly," Proceedings of 6th International Symposium on Supercritical Water-Cooled Reactors (ISSCWR-6). Mar. 3-7, 2013, Shenzhen, Guangdong, China, Paper ISSCWR6-13059.
Peiman et al., "Thermal Design Options of New Pressure Channel for SCWRs", 17th International Conference on Nuclear Engineering, Jul. 12-16, 2009, Brussels, Belgium, Abstract available online: <http://proceedings.asmedigitalcollection.asme.org/proceeding.aspx?articleid=1629677>.
Supplementary European Search Report dated Dec. 12, 2018 in respect of European Patent Application No. 17192914.4.
Extended European Search Report, issued in the related European patent application No. 11771446.9 dated Dec. 15, 2016.
International Preliminary Report on Patentability Issued on PCT/CA2013/050449.
International Search Report Issued on PCT/CA 97/000279.
International Search Report Issued on PCT/CA2013/050449.
Non-Final Rejection dated Apr. 24, 2015 in respect of U.S. Appl. No. 13/641,627.
Non-Final Rejection dated February 7, 2017 in respect of U.S. Appl. No. 13/641,627.
Non-Final Rejection dated Jul. 15, 2015 in respect of U.S. Appl. No. 13/641,627.
Non-Final Rejection dated Jun. 23, 2017 in respect of U.S. Appl. No. 14/407,511.
Final Rejection dated Dec. 1, 2015 in respect of U.S. Appl. No. 13/641,627.
Examiner's requisition issued Mar. 22, 2019 in respect of CA 2,881,784.
Examiner's requisition issued Mar. 28, 2019 in respect of CA 2,876,524.
Examiner's requisition issued Mar. 21, 2019 in respect of CA 2,876,521.
Communication pursuant to article 94(3) EPC dated Dec. 12, 2018 in respect of EP 17 192 194.4.

* cited by examiner

|   | 1 | 2 | 3 | 4 | 5 | 6 | 7 | 8 | 9 | 10 |   |
|---|---|---|---|---|---|---|---|---|---|---|---|
| A |   |   |   |   |   |   | 0.85 | 0.98 | 0.79 | 1.07 | BOC |
|   |   |   |   |   |   |   | 0.94 | 1.06 | 0.84 | 1.12 | EOC |
| B |   |   |   |   | 0.95 | 0.91 | 1.03 | 0.82 | 1.07 | 0.85 |   |
|   |   |   |   |   | 1.07 | 1.00 | 1.12 | 0.87 | 1.12 | 0.88 |   |
| C |   |   | 0.73 | 0.65 | 0.71 | 1.07 | 0.87 | 1.12 | 0.88 | 1.19 |   |
|   |   |   | 0.88 | 0.76 | 0.80 | 1.14 | 0.90 | 1.15 | 0.90 | 1.19 |   |
| D |   |   | 0.65 | 0.92 | 0.92 | 1.03 | 1.03 | 0.92 | 0.99 | 1.01 |   |
|   |   |   | 0.76 | 1.05 | 1.00 | 1.06 | 1.03 | 0.91 | 0.99 | 1.02 |   |
| E |   | 0.95 | 0.71 | 0.92 | 0.92 | 1.29 | 1.13 | 1.24 | 1.02 | 0.87 |   |
|   |   | 1.07 | 0.80 | 1.00 | 0.92 | 1.22 | 1.06 | 1.17 | 0.99 | 0.85 |   |
| F |   | 0.91 | 1.07 | 1.03 | 1.29 | 1.03 | 1.31 | 0.94 | 0.90 | 1.21 |   |
|   |   | 1.00 | 1.14 | 1.06 | 1.22 | 0.94 | 1.19 | 0.87 | 0.84 | 1.13 |   |
| G | 0.85 | 1.03 | 0.87 | 1.03 | 1.13 | 1.31 | 0.97 | 1.07 | 1.24 | 0.94 |   |
|   | 0.94 | 1.12 | 0.90 | 1.03 | 1.06 | 1.19 | 0.88 | 0.99 | 1.14 | 0.87 |   |
| H | 0.98 | 0.82 | 1.12 | 0.92 | 1.24 | 0.94 | 1.07 | 1.13 | 1.09 | 1.07 |   |
|   | 1.06 | 0.87 | 1.15 | 0.91 | 1.17 | 0.87 | 0.99 | 1.05 | 1.02 | 1.00 |   |
| J | 0.79 | 1.07 | 0.88 | 0.99 | 1.02 | 0.90 | 1.24 | 1.09 | 0.95 | 1.07 |   |
|   | 0.84 | 1.12 | 0.90 | 0.99 | 0.99 | 0.84 | 1.14 | 1.02 | 0.89 | 1.01 |   |
| K | 1.07 | 0.85 | 1.19 | 1.01 | 0.87 | 1.21 | 0.94 | 1.07 | 1.07 | 1.10 |   |
|   | 1.12 | 0.88 | 1.19 | 1.02 | 0.85 | 1.13 | 0.87 | 1.00 | 1.01 | 1.03 |   |

FIG. 6

FUEL CHANNEL ASSEMBLY AND FUEL BUNDLE FOR A NUCLEAR REACTOR

CROSS REFERENCE TO RELATED APPLICATIONS

This application is a Continuation of co-pending U.S. application Ser. No. 14/420,999, which itself is national stage entry of PCT/CA2013/050447 filed on Jun. 13, 2013 and which claims priority to U.S. Provisional Application Nos. 61/659,219 and 61/659,229, both filed on Jun. 13, 2012, and U.S. Provisional Application No. 61/731,853 filed on Nov. 30, 2012; the entire contents of each are hereby incorporated herein by reference.

FIELD

The present disclosure relates generally to nuclear reactor technology.

BACKGROUND

The following is not an admission that anything discussed therein is prior art or part of the knowledge of persons skilled in the art.

The Canadian supercritical water cooled reactor (SCWR) is a pressure tube-based reactor concept with heavy water moderator and supercritical light water coolant. Some features of the Canadian SCWR common to conventional heavy water moderated reactors (HWR) are the separation of coolant and moderator by pressure tubes, and the arrangement of fuel pins in annular fuel rings. The Canadian SCWR features common to light water (LWR) or boiling water reactors (BWR) are the vertical arrangement of the core, large axial variation in the coolant density and temperature, and use of long fuel assemblies rather than stacks of short fuel bundles. The supercritical water based steam cycle in the Canadian SCWR may be similar to that used in existing supercritical-fossil-fired plants.

Safety enhancements in the Canadian SCWR may be achieved through passive safety features such as a negative power coefficient, negative reactivity coefficients, and/or passive decay heat removal through the moderator. The Canadian SCWR may achieve improvements in both economics and sustainability through enhanced thermal efficiency, as high as 48%, compared to about 33% for conventional reactors. Improvements in economic performance may also be achieved through the simplification of balance of plant realized through a direct steam cycle. The use of a plutonium thorium-based fuel cycle in the Canadian SCWR, instead of enriched uranium, may aid in improved sustainability by reducing the overall need for mined uranium, thereby extending world uranium reserves. Enhanced security in the Canadian SCWR may be achieved through the use of fuel cycles with increased intrinsic proliferation resistance and appropriate safeguards.

INTRODUCTION

The following is intended to introduce the reader to the detailed description that follows and not to define or limit the claimed subject matter.

In an aspect of the present disclosure, a fuel assembly for a pressure-tube nuclear reactor may include: a fuel channel assembly including an outer conduit, an inner conduit received within the outer conduit and defining an annular fuel bundle chamber therebetween for receiving a flow of a coolant in one direction, the inner conduit including a central flow passage for receiving a flow of the coolant in an opposite direction; and a fuel bundle positioned within the fuel bundle chamber, the fuel bundle comprising a plurality of fuel elements, and consisting of an inner ring of the fuel elements surrounding the inner conduit, and an outer ring of the fuel elements surrounding the inner ring.

A first ratio of a cross sectional area of the coolant in the fuel bundle chamber and the central flow passage to a cross sectional area of the fuel elements may be between approximately 2.6 and 7.5. A second ratio of a cross sectional area of the coolant in the central flow passage to a cross sectional area of the coolant in the fuel bundle chamber may be between approximately 0.8 and 1.3.

The inner and outer conduits may have generally circular axial cross sectional shapes. The central flow passage may be laterally surrounded by the fuel bundle. A central axis of the central flow passage may be laterally centered relative to the fuel bundle. The fuel bundle may be rotationally symmetrical about the central axis. The fuel elements of the inner ring may be positioned along a first common circumference about the central axis, and the fuel elements of the outer ring may be positioned along a second common circumference about the central axis that is concentric with and laterally outboard of the first common circumference. A number of the fuel elements in the inner ring may be equal to a number of the fuel elements in the outer ring. A subchannel distance between each of the fuel elements in the inner ring and the corresponding adjacent one of the fuel elements of the outer ring may be approximately equal to a subchannel distance between each of the fuel elements in the inner ring.

The fuel elements may have generally circular axial cross sections. Axial cross sectional areas of each of the fuel elements in the inner ring may be different than axial cross sectional areas of each of the fuel elements in the outer ring. The fuel elements of the inner ring may have a smaller cross sectional area than the fuel elements of the outer ring.

The fuel channel assembly may include an insulator that is positioned radially intermediate of the fuel bundle chamber and the outer conduit. The insulator may be encapsulated between inner and outer liner tubes, and the outer liner tube may be arranged along an interior surface of the outer conduit. The insulator may be formed of a solid material. The inner and outer liner tubes may be formed of different materials.

A nuclear reactor may include a plurality of the fuel assemblies arranged in a lattice, wherein a moderator region laterally surrounds the outer conduit of each of the fuel assemblies, the moderator region retaining a moderator therein. A third ratio of a cross sectional area of the moderator in the moderator region to a cross sectional area of the fuel elements may be between approximately 10 and 20. A forth ratio of a cross sectional area of the moderator in the moderator region to a cross sectional area of the coolant in the fuel bundle chamber and the central flow passage may be between approximately 2.7 and 3.7.

For each fuel assembly, the coolant may flow downwardly in the central flow passage, and upwardly in the fuel bundle chamber. For each fuel assembly, the inner and outer conduits may be received within a pressure tube. Each pressure tube may include a closed lower end that receives the flow of the coolant from the central flow passage, and directs the flow of the coolant into the fuel bundle chamber. The nuclear reactor may further include a first plenum chamber in fluid communication with each pressure tube to supply the coolant to the central flow passage, and a second plenum chamber in fluid communication with each pressure tube to collect the coolant from the fuel bundle chamber. The coolant may be light water, and the moderator may be heavy water.

In an aspect of the present disclosure, a fuel assembly for a nuclear reactor may include: a fuel channel assembly including an outer conduit, an inner conduit received within the outer conduit and defining an annular fuel bundle chamber therebetween for receiving a flow of coolant in one direction, the inner conduit including a central flow passage for receiving a flow of the coolant in an opposite direction; and a fuel bundle positioned within the fuel bundle chamber, the fuel bundle including a plurality of fuel elements, wherein at least one of the following conditions is satisfied: (i) a first ratio of a cross sectional area of the coolant in the fuel bundle chamber and the central flow passage to a cross sectional area of the fuel elements is between approximately 2.6 and 7.5; and (ii) a second ratio of a cross sectional area of the coolant in the central flow passage to a cross sectional area of the coolant in the fuel bundle chamber is between approximately 0.8 and 1.3.

In an aspect of the present disclosure, a nuclear reactor may include: a plurality of fuel assemblies arranged in a lattice, each of the fuel assemblies including a fuel channel assembly including an outer conduit, an inner conduit received within the outer conduit and defining an annular fuel bundle chamber therebetween receiving a flow of a coolant in one direction, the inner conduit including a central flow passage receiving a flow of the coolant in an opposite direction, and a fuel bundle positioned within the fuel bundle chamber, the fuel bundle including a plurality of fuel elements; and a moderator region laterally surrounding the outer conduit of each of the fuel assemblies, the moderator region retaining a moderator therein, wherein at least one of the following conditions is satisfied: (i) a first ratio of a cross sectional area of the moderator in the moderator region to a cross sectional area of the fuel elements is between approximately 10 and 20; and (ii) a second ratio of a cross sectional area of the moderator in the moderator region to a cross sectional area of the coolant in the fuel bundle chamber and the central flow passage is between approximately 2.7 and 3.7. Both of the conditions (i) and (ii) may be satisfied.

A third ratio of a cross sectional area of the coolant in the fuel bundle chamber and the central flow passage to a cross sectional area of the fuel elements may be between approximately 2.6 and 7.5. A fourth ratio of a cross sectional area of the coolant in the central flow passage to a cross sectional area of the coolant in the fuel bundle chamber may be between approximately 0.8 and 1.3.

For each fuel assembly, the fuel elements may consist of an inner ring surrounding the inner conduit, and an outer ring surrounding the inner ring. For each fuel assembly, the coolant may flow downwardly in the central flow passage, and upwardly in the fuel bundle chamber. For each fuel assembly, the inner and outer conduits may be received within a pressure tube. Each pressure tube may include a closed lower end that receives the flow of the coolant from the central flow passage, and directs the flow of the coolant into the fuel bundle chamber. The nuclear reactor may further include a first plenum chamber in fluid communication with each pressure tube to supply the coolant to the central flow passage, and a second plenum chamber in fluid communication with each pressure tube to collect the coolant from the fuel bundle chamber. The coolant may be light water, and the moderator may be heavy water.

Other aspects and features of the teachings disclosed herein will become apparent, to those ordinarily skilled in the art, upon review of the following description of the specific examples of the present disclosure.

BRIEF DESCRIPTION OF THE DRAWINGS

The drawings included herewith are for illustrating various examples of apparatuses and methods of the present disclosure and are not intended to limit the scope of what is taught in any way. In the drawings:

FIG. 6 is quarter core channel map showing normalized power profiles;

DETAILED DESCRIPTION

Figure 1A:
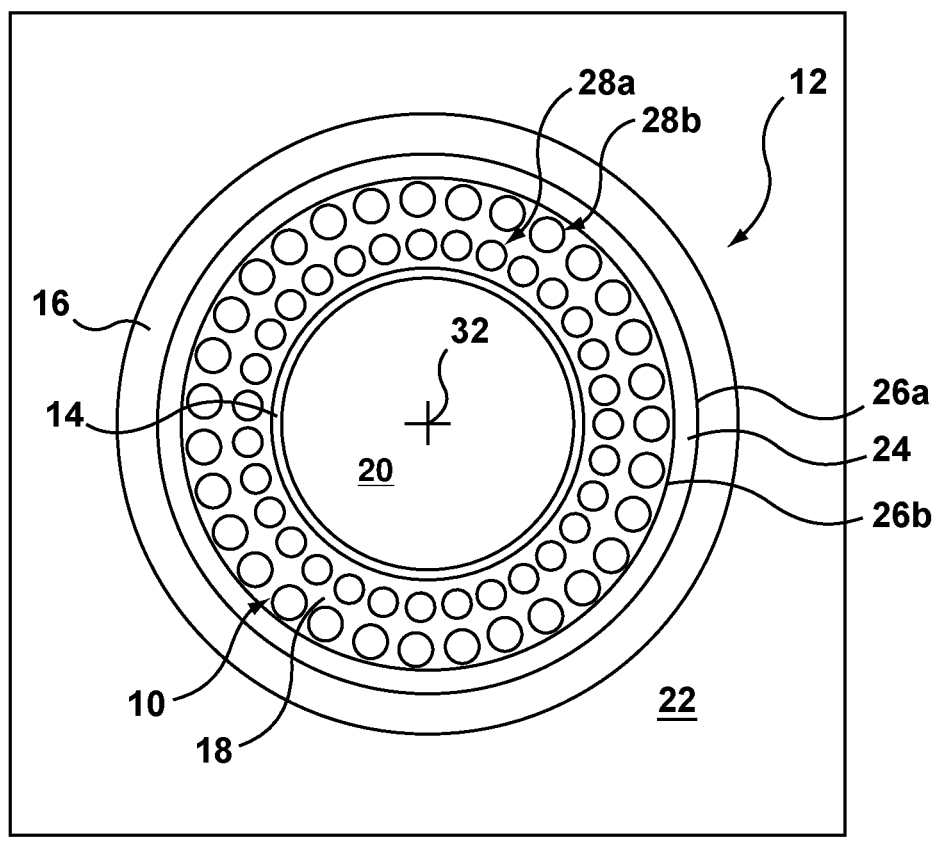
FIG. 1A is a schematic cross sectional view of an example of a fuel bundle and a fuel channel assembly.

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

Recent developments of the Canadian SCWR design include the introduction of a hybrid re-entrant/high efficiency channel. Feeder tubes for coolant flowing out of the fuel channels have been eliminated, and, instead, the fuel channel has a re-entrant or double flow pass configuration. Light water coolant flows from an inlet plenum into flow tubes located in the center of each fuel channel. The bottom ends of the channels are sealed, and when the coolant reaches the bottom of the central flow tubes, it reaches a space at the bottom of each channel where it is redirected upward and flows through the region containing the fuel pins or elements.

Various fuel assembly and nuclear reactor arrangements are disclosed in U.S. Provisional Application Nos. 61/659, 219 and 61/659,229, both filed on Jun. 13, 2012 and entitled

A PRESSURE-TUBE NUCLEAR REACTOR WITH A LOW PRESSURE MODERATOR AND FUEL CHANNEL ASSEMBLY.

According to a first aspect of the present disclosure, neutronics analysis is used in the design process of the Canadian SCWR is to assess values for core physics parameters (e.g., lattice pitch, fissile enrichment of fuel, fuel reload scheme, distribution of burnable neutron absorbers) that may generally optimize various design targets (e.g., reactivity coefficients, exit burnup, power peaking factors). As described in further detail below, the introduction of a central coolant tube, encapsulation of an insulator, and/or reduction in insulator thickness may impact lattice and core physics performance. In particular, these changes may result in a positive increase in coolant void reactivity (CVR) and decrease in exit burnup. Additional changes to the fuel bundle and fuel channel configurations may therefore be introduced in order to lower the CVR and increase the exit burnup. Relative to previous arrangements, the inner ring of fuel may be removed, the fuel pin sizes and number of pins may be adjusted to achieve a better power balance between the two remaining rings, and/or the central flow tube may be expanded. These changes may result in a significant decrease in CVR and large increase in exit burnup, thus recovering the target CVR and exit burnup, and may allow a large margin for additional changes that may be incorporated in the Canadian SCWR design.

According to a second aspect of the present disclosure, thermalhydraulics analysis is used to investigate optimization of fuel bundle geometry based on cladding temperatures obtained for axial and radial power profiles corresponding to various design options and conditions. The thermalhydraulic assessment focuses specifically on the maximum wall temperature, which may be an important parameter in the design of the fuel bundle. The maximum wall temperature limit may be set based on the requirement to preserve fuel element integrity, and may be required to be below 850° C., for example.

Figure 1B:
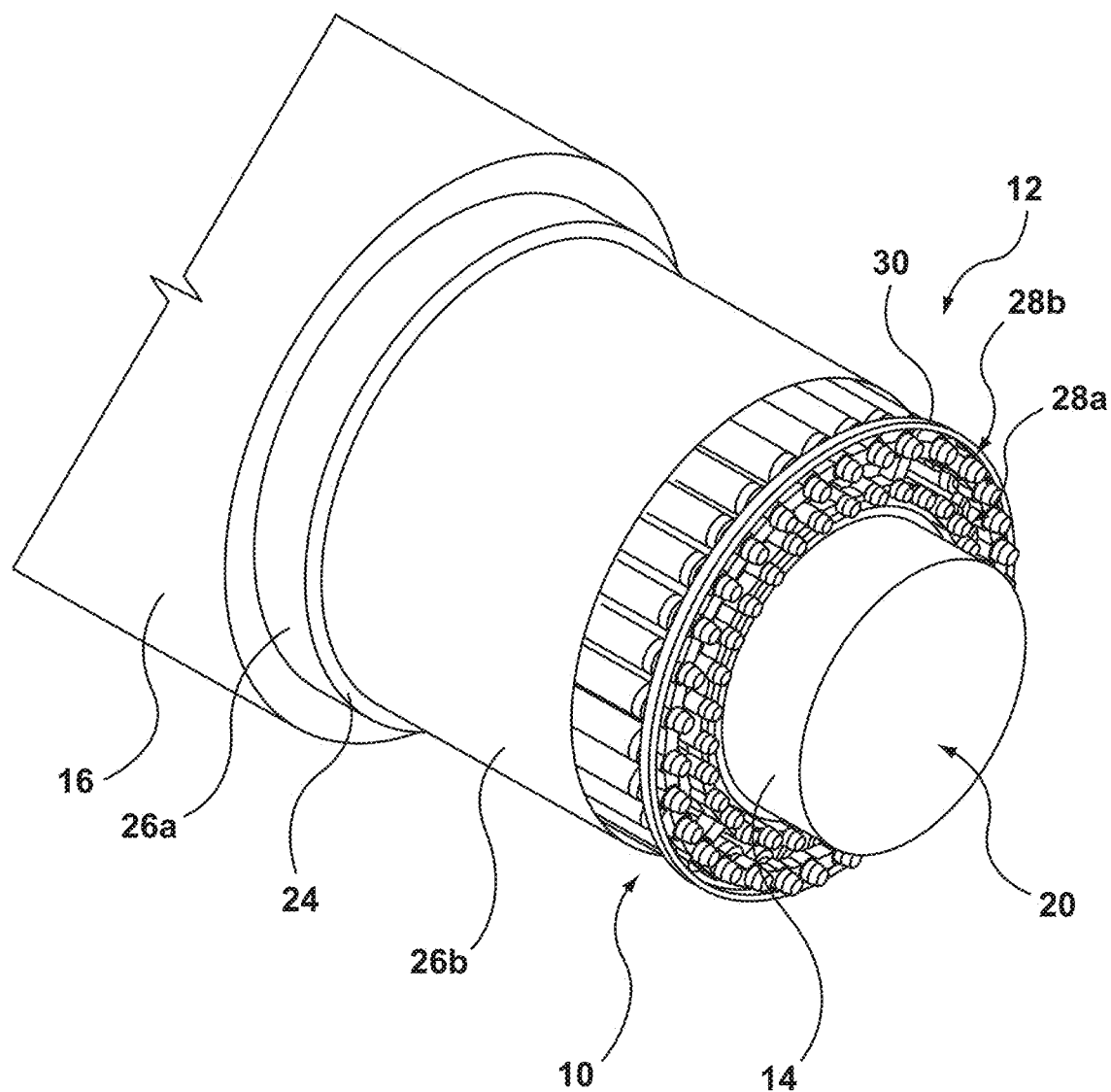
FIG. 1B is a cutaway perspective view of the fuel bundle and the fuel channel assembly of FIG. 1A.

Referring to FIGS. 1A and 1B, a fuel bundle 10 is housed in a fuel channel assembly 12. The fuel channel assembly 12 may be referred to herein as a high-efficiency re-entrant channel (HERC).

In the example illustrated, the fuel channel assembly 12 includes a flow tube or inner conduit 14, which is received within a pressure tube or outer conduit 16. In some examples, the conduits 14, 16 may be received within one or more additional conduits or pressure tubes (not shown). The inner and outer conduits 14, 16 are illustrated to have generally circular axial cross sectional shapes. Other cross sectional shapes, for example but not limited to, square and hexagonal, may be possible. A fuel bundle chamber 18 is defined by an annular space between an outer surface of the inner conduit 14 and an opposed inner surface of the outer conduit 16. The fuel bundle 10 is received in the fuel bundle chamber 18, and laterally surrounds a central flow passage 20. Moderation region 22 laterally surrounds the outer conduit 16.

In some examples, the inner conduit 14 includes the central flow passage 20 that accommodates downflow of light water coolant, whereas the fuel bundle chamber 18 receives the corresponding upflow of the coolant. However, in some examples, it may be possible to reverse the orientation of the reactor, so that the plenum is arranged on the bottom of the fuel assembly, and the light water coolant would flow up through the central flow passage 20 and then down through the fuel bundle chamber 18. Furthermore, arrangements of the fuel assembly other than vertical may be possible, including, for example, a horizontal arrangement.

The fuel channel assembly 12 may further include an insulator 24. The insulator 24 may be sized to be received within the inner surface of the outer conduit 16, so that it is positioned radially intermediate of the fuel bundle chamber 18 and the outer conduit 16. Liner tubes 26a, 26b may encapsulate the insulator 24 to provide a physical barrier between the outer conduit 16 and the insulator 24, and the insulator 24 and the fuel bundle chamber 18, respectively. In some examples, the fuel bundle chamber 18 may include an additional liner tube (not shown) arranged between it and the liner tube 26b.

In the example illustrated, the fuel bundle 10 includes a plurality of fuel elements or pins 28a, 28b, which are arranged about the inner conduit 14 into two, generally concentric rings. However, in some examples, other arrangements of the fuel elements 28a, 28b may be possible, including arrangements having three rings or more, or grid arrangements.

In the example illustrated, the fuel elements 28a of the inner ring are positioned along a first common circumference about a central axis 32 of the fuel channel assembly 12. The fuel elements 28b of the outer ring are positioned along a second common circumference about the central axis 32, which is concentric with and laterally outboard of the first common circumference. The fuel bundle 10 is rotationally symmetrical around the central axis 32 of the fuel channel assembly 12, and the number of the fuel elements 28a in the inner ring is equal to the number of the fuel elements 28b in the outer ring (in this case thirty one each).

In the example illustrated, a subchannel distance between each of the fuel elements 28a in the inner ring and the corresponding adjacent one of the fuel elements 28b of the outer ring may be approximately equal to subchannel distances between each of the fuel elements 28a in the inner ring. As used herein, "subchannel distance" may refer to the closest distance between two adjacent fuel elements 28a, 28b, whether it is two adjacent fuel elements 28a in the inner ring, two adjacent fuel elements 28b in the outer ring, and/or a fuel element 28a in the inner ring and the corresponding adjacent one of the fuel elements 28b of the outer ring. Consistent subchannel geometry may enable a more balanced heat transfer and coolant mass flow within the fuel bundle chamber 18. Axial cross sectional areas of the fuel elements 28a of the inner ring may be varied relative to axial cross sectional areas of the fuel elements 28a of the outer ring to facilitate generally uniform subchannel geometry. In the example illustrated, the fuel elements 28a, 28b have generally circular axial cross sectional shapes, and the fuel elements 28a of the inner ring are smaller than the fuel elements 28b of the outer ring.

Geometry of the fuel bundle 10 and the fuel channel assembly 12 arranged in a nuclear reactor may be limited in their performance by uneven radial power distributions. In previous designs for the Canadian SCWR (see, for example, a 78-element fuel assembly having three concentric rows described in J. PENCER, M. EDWARDS, AND N. ONDER, "Axial and Radial Graded Enrichment Options for the Canadian SCWR", Proc. of the 3rd China-Canada Joint Workshop on Supercritical Water-Cooled Reactors, CCSC-2012, Xi'an, China, 2012 Apr. 18-20; the entire contents of which are hereby incorporated herein by reference), the fission power may be significantly higher in the outer ring than inner rings of fuel elements. The uneven power distribution may result in an underutilization of the inner rings of fuel elements, and may adversely affect the fuel performance of the outer ring. In contrast, fuel bundle 10 may achieve a nearly even power distribution among the inner and outer fuel rings, thus maximizing fuel utilization while minimizing performance issues. Secondary benefits may include a reduction (shift in the negative direction) of CVR, and/or significant increase in lattice reactivity and resultant exit burnup.

With implementations of the fuel bundle 10 and the fuel channel assembly 12 in a reactor, advantages of balanced radial power, lower CVR and higher reactivity may be achieved through a balance of neutron moderation by the heavy water in the moderation region 22, absorption and fission in the fuel elements 28a, 28b, moderation and absorption in the light water coolant in the central flow passage 20, and moderation and absorption in the light water coolant surrounding the fuel elements 28a, 28b within the fuel bundle chamber 18. Moderation in the heavy water in the moderation region 22 may drive fission in the fuel elements 28b of the outer ring, while moderation in the light water coolant in the central flow passage 20 may drive fission in the fuel elements 28a of the inner ring. Balance between these two contributions to the lattice physics behavior may be characterized by the following lattice parameters: (i) ratio of the total cross sectional area of the coolant (in the fuel bundle chamber 18 and the central flow passage 20) to the cross sectional area of the fuel elements 28a, 28b; (ii) ratio of the cross sectional area of the coolant in the central flow passage 20 to the cross sectional area of the coolant surrounding the fuel bundle 10 in the fuel bundle chamber 18; (iii) ratio of the moderator cross sectional area to the cross sectional area of the fuel elements 28a, 28b (in one lattice cell); and (iv) ratio of the cross sectional area of the moderator to the total cross sectional area of the coolant (in one lattice cell).

Lattice level scoping studies were performed to examine the impact of variation of the parameters above on the ratio of power densities of the outer to inner fuel rings, lattice CVR, and infinite lattice neutron multiplication factor, k-infinity (ratio of neutrons produced to neutrons absorbed). The target for the ratio of outer to inner fuel power densities is 1, the lattice CVR target is to be negative, and the k-infinity target is to be maximized. Based on the lattice scoping studies, the following ranges of parameters (applied simultaneously) were found to yield values for power density ratio, CVR and k-infinity that satisfied the targets for lattice physics performance: a coolant-to-fuel ratio of between approximately 2.6 and 7.5; an inner-to-outer coolant ratio of between approximately 0.8 and 1.3; a moderator-to-fuel ratio ranging of between approximately 10 and 20; and a moderator-to-coolant ratio of between approximately 2.7 and 3.7. Based on the relatively wide ranges in the moderator-to-fuel and coolant-to-fuel ratios, the total fuel mass in the fuel assembly may be varied significantly without adverse impacts to power density ratio, CVR or k-infinity. However, other design constraints may restrict the variation in fuel mass in the assembly, such as the maximum allowable power density.

Figure 2A:
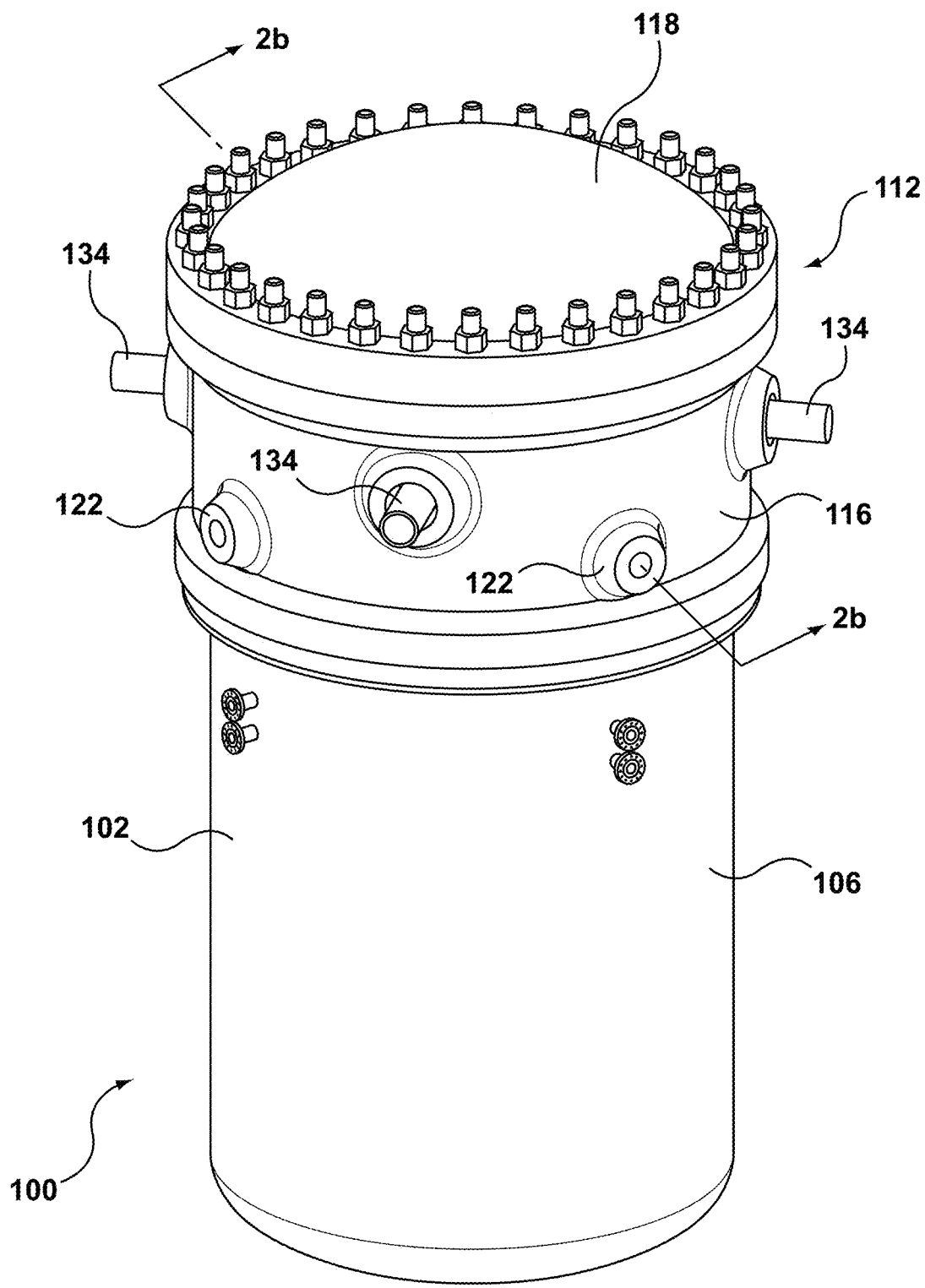
FIG. 2A is a perspective view of a pressure-tube nuclear reactor including a plurality of fuel channel assemblies.
Figure 2B:
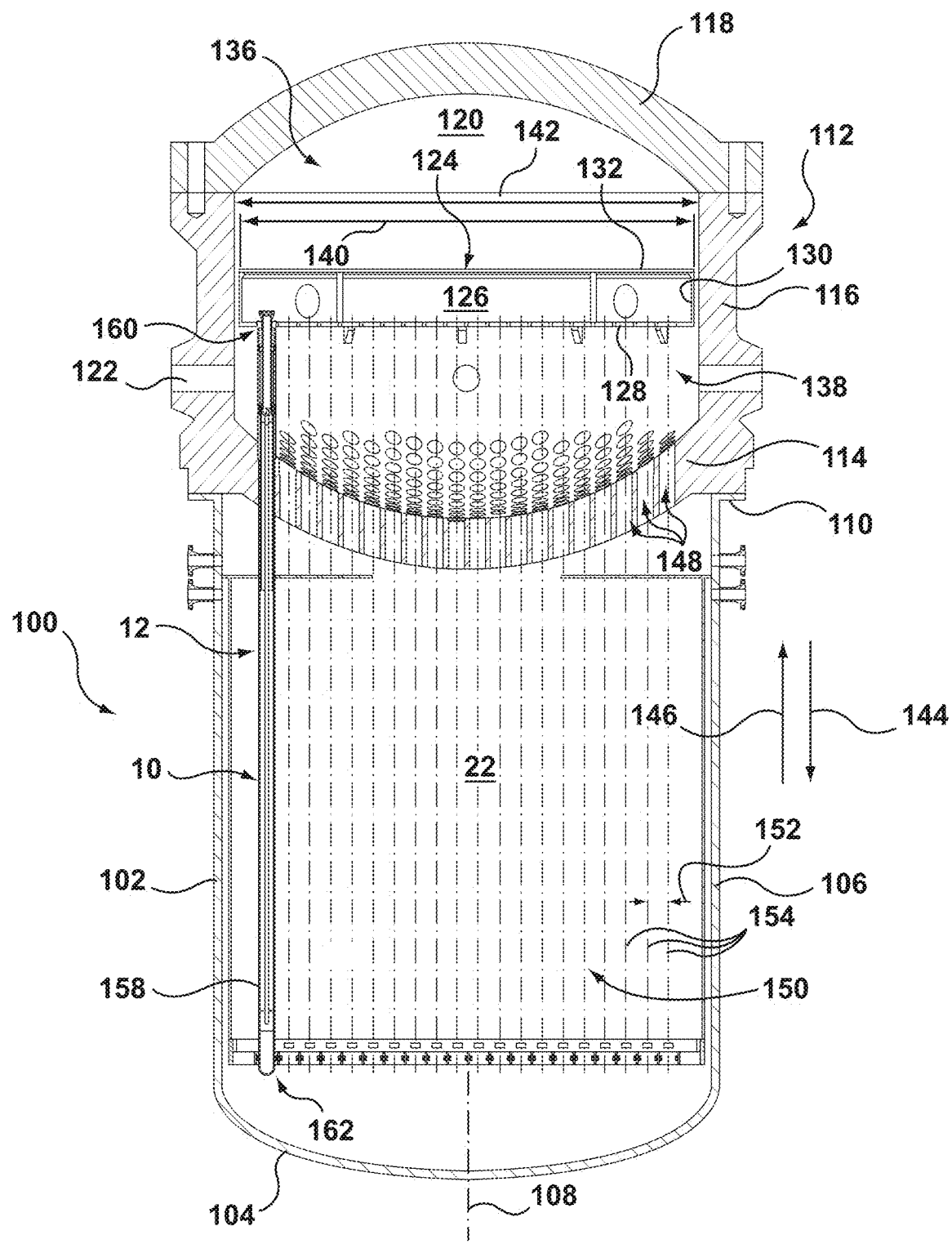
FIG. 2B is a sectional view of the nuclear reactor of FIG. 2A taken along line 2b-2b.

Referring now to FIGS. 2A and 2B, an example of a pressure-tube nuclear reactor 100 includes an outer shell vessel 102, also referred to as a calandria, which is configured to contain a moderator fluid, e.g., heavy water. The calandria 102 includes a bottom wall 104 and a side wall 106 extending upward from the bottom wall 104 about a calandria axis 108, and terminating at an upper rim 110. In the example illustrated, the calandria 102 is shown as being generally circular in axial cross-sectional shape.

Referring to FIG. 2A, a pressurized coolant plenum vessel 112 is connected to the upper rim 110 of the calandria 102. The plenum vessel 112 is configured to supply coolant to a plurality of the fuel channel assemblies 12 (FIG. 2B) in the reactor 100 and to extract the heated coolant from the fuel channel assemblies 12 after the coolant has been heated by flowing past the fuel bundles 10 (FIGS. 1A and 1B) contained within the fuel channel assemblies 12. The coolant is pressurized to a higher pressure than the moderator, and the plenum vessel 112 is a pressure vessel capable of withstanding the operating temperatures and pressures of the coolant.

Referring to FIG. 2B, in the illustrated example the plenum vessel 112 includes a tubesheet 114, a sidewall 116 and a cover 118 that cooperate to define a first plenum chamber 120. In the example illustrated, the first plenum chamber 120 is in fluid communication with each of the fuel channel assemblies 12 to allow coolant to flow between the first plenum chamber 120 and each of the fuel channel assemblies 12. Only a single fuel channel assembly 12 is illustrated for clarity. One or more fluid ports may be provided in the plenum vessel 112 to allow coolant to flow in and out of the first plenum chamber 120. In the example illustrated, the plenum vessel includes four ports 122 spaced apart from each other around the sidewall 116.

In the example illustrated, a second plenum 124 is nested within the first plenum chamber 120. The second plenum 124 includes a second plenum chamber 126 that is bounded by a bottom wall 128, a sidewall 130 and an upper wall or lid 132. In this configuration, the second plenum chamber 126 is self-contained and is fluidly isolated from the first plenum chamber 120 so that fluid within the second plenum 124 does not mix with fluid in the first plenum chamber 120.

In the example illustrated, the second plenum 124 is sized such that a width 140 of the second plenum 124 is less than an internal width 142 of the first plenum chamber 120. In this configuration, a gap around the perimeter of the second plenum 124, between an outer surface of the second plenum sidewall 130 and an opposing inner surface of the first plenum sidewall 116, provides a fluid flow path around the outside of the second plenum 124 to link the upper portion 136 and lower portion 138.

With continued reference to FIG. 2B, the bottom wall 128 of the second plenum 124 includes a plurality of apertures for connecting to each of the fuel channel assemblies 12 to allow coolant fluid to flow between each of the fuel channel assemblies 12 and the second plenum chamber 126. In this configuration, a coolant flow path is provided so that coolant fluid may flow between the first plenum chamber 120 and the second plenum chamber 126 via the fuel channel assemblies 12. Optionally, some or all of the fuel channel assemblies 12 may be detachably coupled to the bottom wall 128 using any suitable connector. Providing detachable connections may allow individual fuel channel assemblies 12 to be removed, serviced and/or replaced without requiring replacement of other fuel channel assemblies 12.

In the example illustrated, the first plenum chamber 120 functions as a coolant inlet plenum, the ports 122 operate as coolant inlet ports, the second plenum chamber 126 functions as a coolant outlet plenum and its ports 134 (FIG. 2A) function as coolant outlet ports. In this configuration, the first plenum chamber 120 is in fluid communication with each fuel channel assembly 12 to supply coolant and the second plenum chamber 126 is in fluid communication with each fuel channel assembly 12 to collect the heated coolant fluid. The coolant flows from the first plenum chamber 120 in a downward direction 144 through the central flow passage 20 (FIGS. 1A and 1B) of the fuel channel assemblies 12, and flows to the second plenum chamber 126 in an upward direction 146 through the fuel bundle chambers 18 (FIGS. 1A and 1B) of the fuel channel assemblies 12. The fuel bundles 10 are positioned within the fuel channel assembly 12 in the flow path of the coolant flowing in the upward direction 146.

Coolant may be supplied to the first plenum chamber 120 at any suitable inlet temperature and inlet pressure. The combination of inlet temperature and pressure desired may be based on the properties of a given reactor core design and/or nuclear fuel type. Optionally, the plenum vessel 112 may be configured to handle liquid coolants, gas coolants, mixed-phase coolants and supercritical coolant conditions. For example, in some configurations the inlet temperature may be between about 100° C. and about 370° C. or more, and may be between about 260° C. and about 350° C. The inlet pressure may be between about 5 MPa and about 30 MPa or more, and may be between about 10 MPa and about 26 MPa. Optionally, the inlet conditions may be selected so that the incoming coolant remains subcritical. This may help facilitate greater energy pickup from the fuel bundles 10 when the coolant flows through the fuel channel assemblies 12.

The temperature and pressure of the coolant as it exits the fuel channel assemblies 12, and flows into the second plenum 124, may vary based on the quantity of heat transferred from the fuel bundles 10 and the amount of pressure drop generated as the coolant flows past the fuel bundles 10 in the fuel channel assembly 12. When operated in subcritical conditions, the outlet temperature may be between about 290° C. and about 350° C. and the outlet pressure may be between about 8-12 MPa. When operated under supercritical coolant conditions, the outlet temperature may be between about 374° C. and about 675° C. (and may be about 625° C.) and the outlet pressure may be about 22-26 MPa. In other configurations, the outlet pressure may be between about 12 and about 22 MPa and may be greater than 26 MPa.

In some configurations, there may be a significant temperature difference between the coolant in the first plenum chamber 120 and coolant in the second plenum 124. For example, under supercritical operating conditions, the temperature difference between the inlet plenum 120 and outlet plenum 124 may be between about 250-300° C., or more. Such temperature differences may impart significant thermal stresses in the lid 132, sidewall 130 and bottom wall 128. As it is located outside of the neutron field, the outlet plenum 124 may be made from a variety of suitable materials, including, for example stainless steel and nickel-based super alloys. Optionally, some or all of the outlet plenum 124 may be thermally insulated using any suitable techniques and/or materials to help limit heat transfer between the plenums 120, 124 and to help reduce thermal stresses on the second plenum 124. For example, the lid 132, sidewall 130 and bottom wall 128 may be coated with an insulating material and/or made from multiple layers. Alternatively, as the pressure difference between the plenums may be relatively small, the second plenum 124 may be formed from materials that have desirable thermal properties, including, for example refractory materials and ceramic-based materials, instead of highly thermally conductive metals.

Heated coolant extracted from the second plenum 124 will often be used to generate electrical power. Optionally, the heated coolant fluid may be used to directly drive suitable steam turbine generators (not shown). This may help improve the efficiency of a nuclear power generation station as the heated coolant may remain at a high temperature when it reaches the turbines. Alternatively, the heated coolant may be used to heat a secondary circuit, for example via a steam generator, and the turbine generators may be driven by steam in the secondary circuit. Configuring the system to include a steam generator and secondary circuit may help increase the safety of the power generation system, but may reduce overall efficiency.

In the example illustrated, the tubesheet 114, in combination with the fuel channel assemblies 12, forms part of the pressure barrier between the high pressure coolant and the low pressure moderator. The tubesheet 114 may also separate the reactor core (containing fissile nuclear fuel) from the non-core portions of the reactor. The tubesheet 114 includes a plurality of apertures 148 to accommodate the plurality of fuel channel assemblies 12.

Referring to FIG. 2B, a plurality of fuel channel assemblies 12 are arranged in a lattice 150, and each extends from the plenum vessel 112 into the calandria 102. Portions of each of the fuel channel assemblies 12 are submerged in the moderation region 22. The number, configuration and arrangement or pitch spacing of the apertures 148 in the tubesheet 114 (defined as generally horizontal distance 152 between fuel channel axes 154 within the lattice 150) may be any suitable distance.

In the example illustrated, fuel channel assembly 12 includes a pressure tube 158, and the inner and outer conduits 14, 16 (FIGS. 1A and 1B) are received within the pressure tube 158. The pressure tube 158 of each of the fuel channel assemblies may be sealed to the tubesheet 114, and provide both pressure and fluid separation between the moderator in the moderation region 22 and the coolant circulating within the fuel channel assemblies 12.

In the example illustrated, an upper end 160 of each of the fuel channel assemblies 12 is connected to the bottom wall 128 of the second plenum 124. Adjacent to the bottom wall 128, and above the tubesheet 114, inlet ports and feeder conduits provide fluid communication between the first plenum chamber 120 and the central flow passage 20 (FIGS. 1A and 1B). The inlet ports are arranged about the outer conduit 16, and the feeder conduits provide a fluid-sealed connection between the inlet ports and the central flow passage 20, while permitting flow of the heated coolant upwardly through the fuel bundle chamber 18.

Each of the fuel channel assemblies 12 extends downwardly generally parallel to the axis 108 from the upper end 160 to a closed lower end 162. The length of each fuel channel assembly 12 may be selected to be any suitable length that is compatible with other components of the reactor 100, and may be, for example, between about 1 m and about 10 m. The axial length of the fuel bundle 10 within each fuel channel assembly 12 may be any suitable length, and may be between about 0.2 m and about 5 m or more.

In the example illustrated, the fuel bundle 10 is made up of a single bundle of the fuel elements 28a, 28b. In other examples, the fuel bundle may be formed of multiple portions arranged axially along the length of the fuel assembly 12 within the moderation region 22. Multiple portions facilitate batch-fueling of the reactor 100 axially, as well as radially within the lattice 150.

The closed lower end 162 contains the coolant exiting the central flow passage 20 (FIGS. 1A and 1B), and directs the coolant upward into the fuel bundle chamber 18. The inner conduit 14 may optionally extend axially beyond a lower face of the fuel bundle 10 in the fuel channel assembly 12 by an extension length. Extending the inner conduit 14 beyond the lower face of the fuel bundle 10 may help balance the distribution of coolant flow within the fuel bundle chamber 18 before it reaches the lower face. Optionally, one or more flow directors (not shown), including for example a baffle, vane, guide or other flow directing apparatus, may be provided axially between the lower face of the fuel bundle 10 and a lower end of the inner conduit 14 to help modify or balance the coolant flow as it enters the fuel bundle chamber 18. Extending the inner conduit 14 beyond the lower face may also help accommodate thermal expansion (lengthening) and/or creep of the fuel bundle 10 when the reactor 100 is in use, to help provide coolant flow to the lowermost portion of the fuel bundle 10.

While the present disclosure refers to the use of the fuel bundle 10 and fuel channel assembly 12 specifically in the context of the Canadian SCWR design, it should be appreciated that the teachings herein may be applicable to other nuclear reactor designs.

Reference is now made to the following description of neutronics and thermalhydraulic analysis of exemplary configurations of the fuel bundle 10 and fuel channel assembly 12, which is intended to be illustrative but non-limiting.

1. Neutronics Analysis

A. Geometrical and Material Specifications

The outermost component of the HERC is the outer conduit 16, which may be formed of an Excel (zirconium-based) alloy. In some conventional pressure tube reactor fuel channel designs, the pressure tube is separated from the moderator by a $CO_2$ filled gap surrounded by a calandria tube. However, for the HERC design, the calandria tube and gap are omitted and the pressure tube 16 may be in direct contact with the heavy water in the moderation region 22. The insulator 24 may be solid, encapsulated zirconia, and may be located directly inside the outer conduit 16, and isolate it from the high temperatures in the coolant. The insulator 24 may be supported on its outer surface by the liner tube 26a, which may be formed of a solid Excel alloy. The insulator 24 may be supported on its inner surface by the liner tube 26b, which may be formed of solid zirconium-modified stainless steel. The coolant enters at a top (not shown) of the inner conduit 14 into the central flow passage 20. The coolant then flows down the central flow passage 20, reaches the bottom (not shown) and is directed upwards into the fuel bundle chamber 18, where it is heated up by the fuel bundle 10.

Exemplary specifications for the fuel bundle 10 and the fuel channel assembly 12 are given in Table 1.

TABLE 1

Fuel bundle and fuel channel assembly exemplary specifications.

| Component | Dimension | Material | Composition (wt %) | Density (g/cm³) |
|---|---|---|---|---|
| Central Flow Passage 20 | 4.45 cm radius | Light Water | 100% $H_2O$ | 0.59254 |
| Inner Conduit 14 | 4.45 cm inner radius (IR) 0.1 cm thick | Zr-modified 310 Stainless Steel (Zr-mod SS) | C: 0.034; Si: 0.51; Mn: 0.74; P: 0.016; S: 0.0020; Ni: 20.82; Cr: 25.04; Fe: 51.738; Mo: 0.51; Zr: 0.59 | 7.90 |
| Fuel Elements 28a (inner ring) | 0.415 cm radius 5.30 cm pitch circle radius no displacement angle | 15 wt % $PuO_2/ThO_2$ | Pu: 13.23; Th: 74.70; O: 12.07 | 9.91 |

TABLE 1-continued

Fuel bundle and fuel channel assembly exemplary specifications.

| Component | Dimension | Material | Composition (wt %) | Density (g/cm³) |
|---|---|---|---|---|
| Fuel Elements 28b (outer ring) | 0.465 cm radius 6.55 cm pitch circle radius no displacement angle | 12 wt % $PuO_2/ThO_2$ | Pu: 10.59; Th: 77.34; O: 12.08 | 9.87 |
| Fuel Cladding | 0.06 cm thick | Zr-mod SS | As above | 7.90 |
| Coolant | n/a | Light Water | 100% $H_2O$ | Variable |
| Liner Tube 26a | 7.20 cm IR 0.05 cm thick | Zr-mod SS | As above | 7.90 |
| Insulator 24 | 7.25 cm IR 0.55 cm thick | Zirconia ($ZrO_2$) | Zr: 66.63; Y: 7.87; O: 25.5 | 5.83 |
| Liner Tube 26b | 7.80 cm IR 0.05 cm thick | Excel (Zirconium Alloy) | Sn: 3.5; Mo: 0.8; Nb: 0.8; Zr: 94.9 | 6.52 |
| Outer Conduit 16 | 7.85 cm IR 1.2 cm thick | Excel (Zirconium Alloy) | Sn: 3.5; Mo: 0.8; Nb: 0.8; Zr: 94.9 | 6.52 |
| Moderation region 22 | 25 cm square lattice pitch | $D_2O$ | 99.833% $D_2O$; 0.167% $H_2O$ | 1.0851 |
| na | na | Rg-Pu | Pu-238: 2.75; Pu-239: 51.96; Pu-240: 22.96; Pu-241: 15.23; Pu-242: 7.10 | |

The inner conduit 14 may be a solid tube of zirconium-modified stainless steel. The inner conduit 14 prevents mixing of the downward flowing coolant with the upward flowing coolant. In some examples, although not shown, the inner conduit 14 may include an insulating layer in order to prevent heat transfer to the downward flowing coolant.

In the example illustrated, the fuel bundle 10 has two concentric fuel rings, each with 31 elements, which may be composed of mixtures of thorium dioxide and plutonium dioxide. However, in some examples, other conventional combinations of nuclear fuel may be used. For example, the concepts described herein may also work with enriched urania fuel, and may work with an enriched urania and thoria mixture-based fuel. The fuel elements 28a, 28b may be clad in 0.6 mm thick zirconium-modified 310 stainless steel.

For the purposes of calculations herein, the $PuO_2$ may be the oxide form of reactor grade plutonium (Rg-Pu), which may be recycled from used light water reactor fuel. The Pu isotopic composition is based on previous samples. The thorium may be assumed to be isotopically pure Th-232. The theoretical densities of pure $PuO_2$ and $ThO_2$ used herein were 10.0 g/cm³ and 11.5 g/cm³, respectively, based on data in previous studies. For the (Pu—Th)$O_2$ mixtures, it was assumed that the densities of the mixtures were simply the volume weighted averages of the components. It was further assumed that the fuels in pellet form had densities equal to 97% times the theoretical density.

Grid spacers 30 (FIG. 1B) and/or wire wrap (not shown) may be included in the fuel bundle 10 and the fuel channel assembly 12, and appendages may also be added to promote turbulence within the coolant flow. The parasitic absorption in these additional materials may be accounted for in the lattice modeling via an increase in the density, or "smearing", of the stainless materials already present in the modeling herein. This density adjustment is not performed in the current models.

B. Core Geometry and Refueling Scheme

Figure 3:
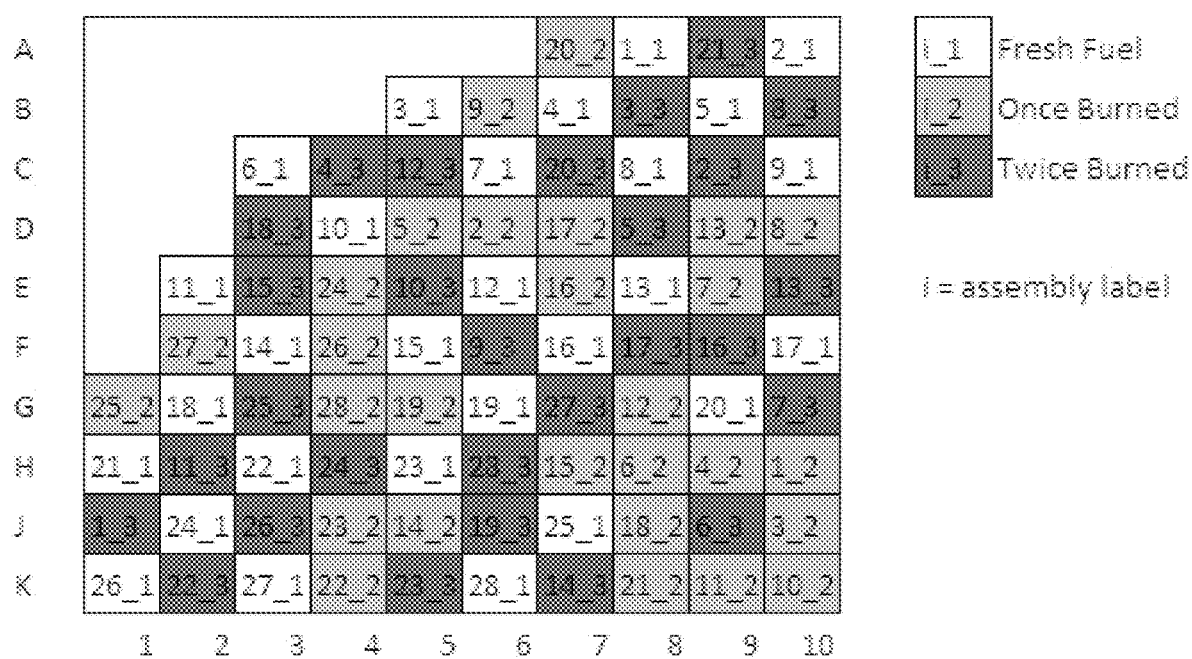
FIG. 3 is a quarter core channel map and fuel loading scheme for a nuclear reactor.

The reactor core is batch-fueled using three batches arranged radially. It is designed to generate 2540 MW of thermal power corresponding to 1200 MW of electric power assuming a 48% thermodynamic cycle efficiency. The core consists of 336 fuel channel assemblies, each containing a 500 cm long fuel bundle arranged in a 25 cm square pitch lattice. The core diameter is 625 cm and core height is 600 cm including 50 cm thick lower and upper axial $D_2O$ reflectors. The channel layout and refueling scheme are shown schematically in FIG. 3. No neutron absorbers or reactivity devices have been incorporated in the core.

C. Impact on Lattice Physics

As discussed above, a number of changes have been made to the fuel bundle and fuel channel assembly design versus previous versions (i.e. the 78-element fuel assembly having three concentric rows). These changes are: addition of the inner conduit 14 with the central flow passage 20 for re-entrant coolant flow; encapsulation of the insulator 24 by the liner tubes 26a, 26b, isolating it from the coolant in the fuel bundle chamber 18; and/or reduction of the thickness of the insulator 24 and change from a porous to solid material.

Figure 4:
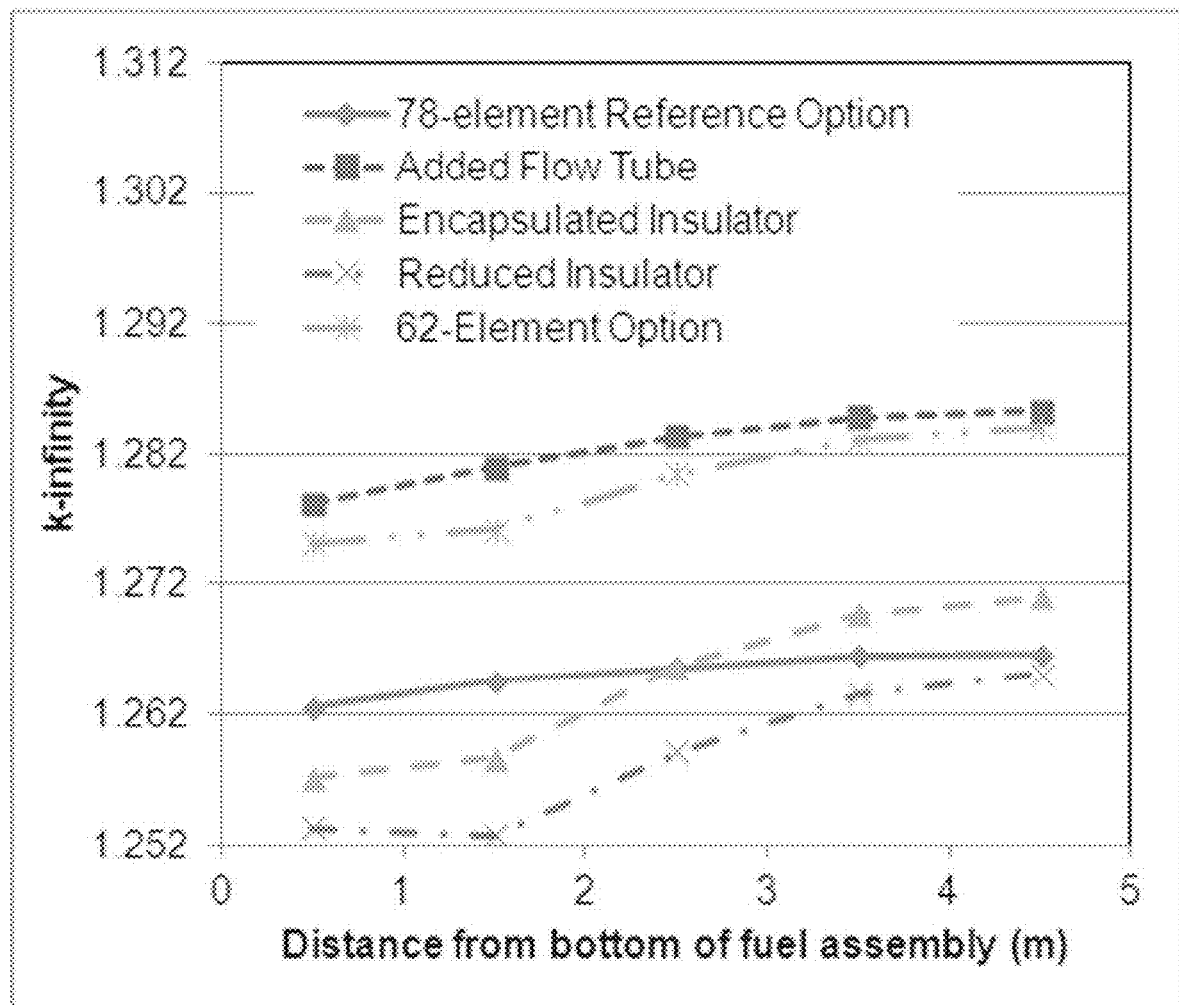
FIG. 4 is a graph of k-infinity modeling data versus axial position in the nuclear reactor.
Figure 5:
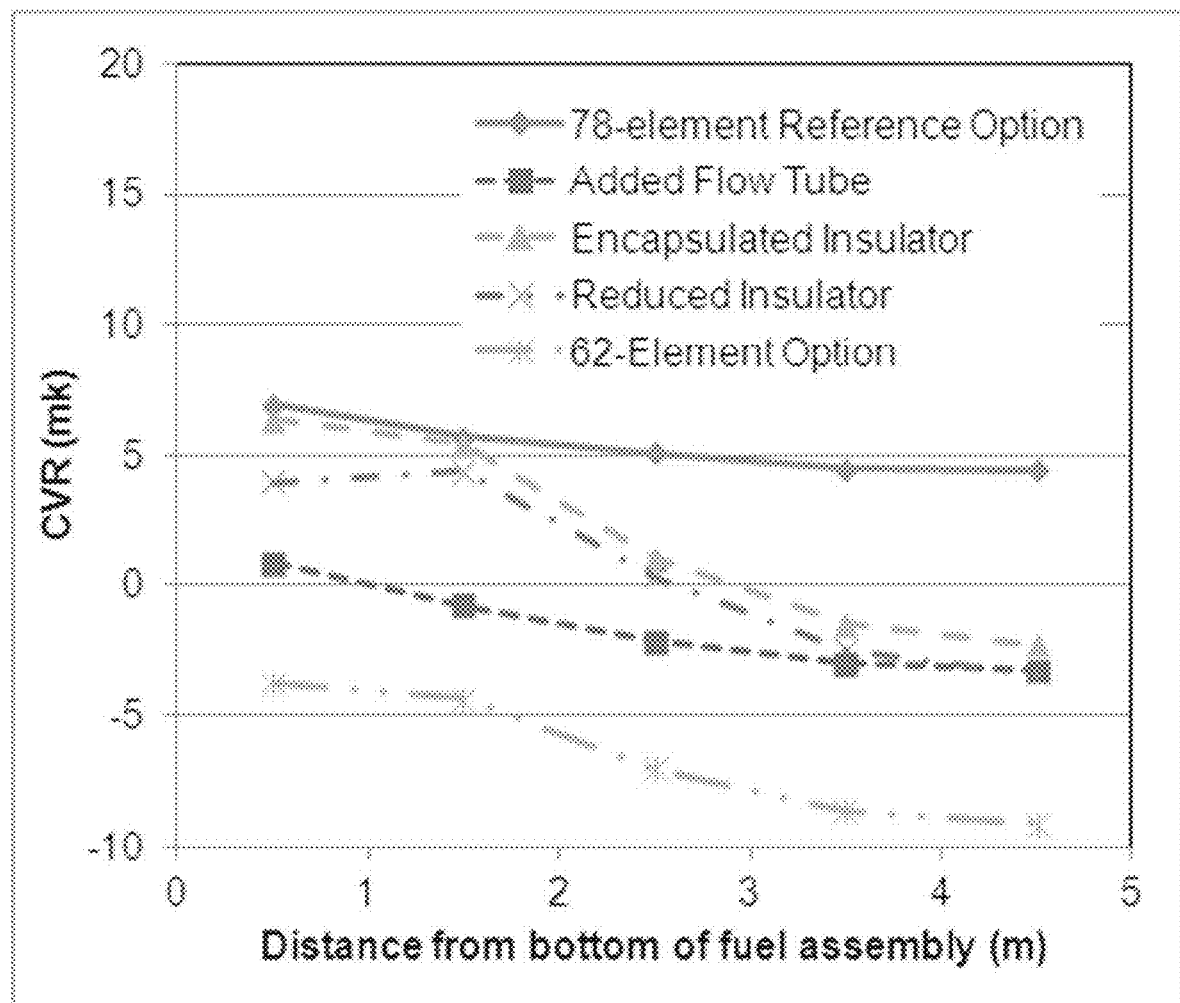
FIG. 5 is a graph of CVR modeling data versus axial position.

The various changes above were investigated for fresh fuel via lattice-based calculations of k-infinity. A software package was used in conjunction with a nuclear data library. The changes to the fuel bundle and channel options were applied cumulatively, starting with the 78-element fuel assembly (described in J. PENCER, M. EDWARDS, AND N. ONDER, "Axial and Radial Graded Enrichment Options for the Canadian SCWR", Proc. of the 3rd China-Canada Joint Workshop on Supercritical Water-Cooled Reactors, CCSC-2012, Xi'an, China, 2012 Apr. 18-20) as a reference, and compared to the present 62-element design. Plots of k-infinity as a function of axial position along the channel are shown in FIG. 4, and corresponding plots of infinite lattice CVR are shown in FIG. 5.

As described herein, changes in reactivity and CVR may be a result of neutron moderation in the coolant region, particularly in the central flow passage 20. The overall impact of the coolant region on excess reactivity (or k-infinity) and CVR may be understood in the context of the impact of lattice pitch and fuel enrichment on SCWR lattice reactivity and CVR. It has been shown that it is possible to shift the CVR in the negative direction via reduction in the lattice pitch (LP). It has also been observed that the dependence of CVR on LP may be determined by the balance between moderation and absorption of neutrons in the coolant. For the cooled lattice, as lattice pitch is decreased, the positive reactivity contribution from neutron moderation in the coolant may dominate over the negative reactivity contribution from neutron absorption. Thus, a lattice pitch may be selected such that the reactivity contribution from neutron moderation in the coolant may dominate over the contribution from absorption. On coolant voiding, the negative reactivity contribution due to the decrease in neutron moderation may therefore dominate over the positive reactivity contribution due to the decrease in neutron absorption, leading to a net decrease in lattice reactivity, and hence a negative coolant void reactivity.

Coolant in the central flow passage 20 (FIG. 1A) may increase k-infinity and may shift the CVR in the negative direction. Both of these results may be a consequence of the additional volume of coolant within the fuel channel assembly 12; the coolant in the central flow passage 20 acts as a moderator, thus increasing the reactivity under normal conditions and leading to a negative contribution to CVR when the moderation is lost. The CVR may therefore be "tuned" or shifted by varying the volume of coolant in the central flow passage 20, which may be achieved by changing the inner diameter of the central flow passage 20. Generally, an increase in the flow tube inner diameter will shift the CVR in the negative direction, while a decrease in the flow tube inner diameter will shift the CVR in the positive direction.

Encapsulation of the insulator 24 may decrease k-infinity and shift CVR in the positive direction. Without encapsulation, for example, a 76% (by volume) porosity insulator may contain a significant (approximately 25%) amount of the coolant inside the fuel channel. Thus, encapsulation of the insulator 24, which eliminates this volume of coolant water, may result in a significant loss of neutron moderation in the coolant region, leading to both a reduction in k-infinity and positive change in CVR. The change from a perforated to solid stainless steel liner tube may increase the amount of stainless steel between the fuel bundle 10 and the moderation region 22, increasing the parasitic neutron absorption, which also may contribute to the reduction in k-infinity.

Reduction of the insulator thickness and change from a porous to a solid insulator may increase the amount of coolant inside the fuel channel assembly 12, but also increases the amount of material between the fuel bundle 10 and the moderation region 22. The net result may be a decrease in k-infinity, due to an increase in the parasitic absorption in the solid insulator, and decrease in CVR, due to the increased moderation in the coolant.

In summary, in comparison with the 78-element fuel assembly according to a previous design, removal of the innermost ring of fuel elements and expansion of the inner conduit 14 may result in an increase in the overall reactivity and shift the CVR in the negative direction. Both of these results may be a consequence of increased moderation in the coolant in the central flow passage 20. The combination of the two concentric rings of fuel elements 28a, 28b in the fuel bundle 10, and significant moderation in the central flow passage 20 of the fuel channel assembly 12, may also aid in balancing the radial power distribution within the fuel assembly.

D. Core Physics

Core calculations were performed using a software package with a nuclear data library based on the specifications described above. Values for integral core parameters (e.g., average exit burnup, etc.) are listed in Table 2, along with corresponding values obtained previously based on the reference 78-element fuel assembly.

TABLE 2

Comparison of integral core parameters.

| Parameter | 78-Element | 62-Element |
| --- | --- | --- |
| Average initial wt % $PuO_2$ | 13% | 13% |
| Average initial fissile wt % heavy element | 8.7% | 8.7% |
| Average Exit Burnup (MWd/kg) | 41.5 | 58.6 |
| Cycle Length (EFPD) | 455 | 425 |
| Excess Reactivity BOC/EOC (mk) | 95.3/9.7 | 108.9/10.0 |
| Coolant Void Reactivity BOC/EOC (mk) | −4.4/−5.7 | −30.4/−45.2 |
| Fuel Temperature Coefficient BOC/EOC (mk/K) | nd/nd | −0.05/−0.05 |
| Moderator Temperature Coefficient BOC/EOC (mk/K) | nd/nd | −0.12/−0.11 |
| Channel Power Peaking Factor BOC/EOC | 1.28/1.19 | 1.31/1.22 |
| Axial Power Peaking Factor BOC/EOC | 1.39/1.19 | 1.18/1.05 |
| Maximum LER (kW/m) | 37.4 | 41.3 |
| Exit [fissile Pu] (wt % HM) | 4.5 | 2.7 |
| Exit [U-233 + Pa-233] (wt % HM) | 1.1 | 1.1 |

The fuel bundle 10 and the fuel channel assembly 12 in accordance with the present design show some performance enhancements over the previous design. There is an almost 50% increase in exit burnup. The extended burnup of the present design also results in a significantly lower (⅓ less) remainder of fissile Pu at the end of the cycle. There is a 15% decrease in the beginning of cycle (BOC) axial peaking factor, and a similar decrease at the end of cycle (EOC). These gains are slightly offset by the reduction in cycle length by about 5% (which reduces the capacity factor), and increase in radial power peaking factor by about 2%. There is also a significant decrease in the core average CVR, which is discussed in more detail below. The fuel temperature (FTC) and moderator temperature (MTC) coefficients were not evaluated previously. For the present design, the FTC and MTC are negative at BOC, EOC and throughout the cycle.

The differences between the two designs may be mainly due to the introduction of the inner conduit 14 with the central flow passage 20. As discussed above, the coolant in the central flow passage 20 may provide a significant amount of neutron moderation. This increased moderation may lead to an increase in net reactivity, which may result in an increase in the maximum achievable exit burnup. The moderation in the central flow passage 20 does not generally change with axial position, and so the axial power profile may vary much less than in the previous design, thus reducing the axial power peaking factor. The reduction in cycle length may be a result of the reduction in fuel mass related to the change in the design, but this reduction may be nearly offset by the increase in initial reactivity. The increase in channel power peaking factor may be due to the larger initial reactivity of fresh fuel, and resultant increase in reactivity difference between fresh and partially irradiated fuel.

The CVR of the core of the present design may be negative and its magnitude may be quite large (e.g., ranging from −30 mk to −45 mk). A negative CVR may be desirable because of the safety advantage of negative reactivity feedback. As discussed above, the CVR may be varied by changing the inner diameter of the central flow passage 20 of the inner conduit 14. An appropriate range for the core average CVR may therefore be achieved through selection of flow volume in the central flow passage 20.

Referring to FIG. 6, a quarter core channel map of normalized channel power profile is provided at the beginning of cycle (BOC) and the end of cycle (EOC). This power profile is similar to that observed previously with the 78-element fuel assembly, although the peak channel powers are slightly higher. The highest channel powers correspond to the fuel channel assemblies having fresh fuel, and it is anticipated that some degree of power leveling may be achieved with the addition of burnable neutron absorber in the fresh fuel, or variation in fresh fuel enrichment.

Figure 7:
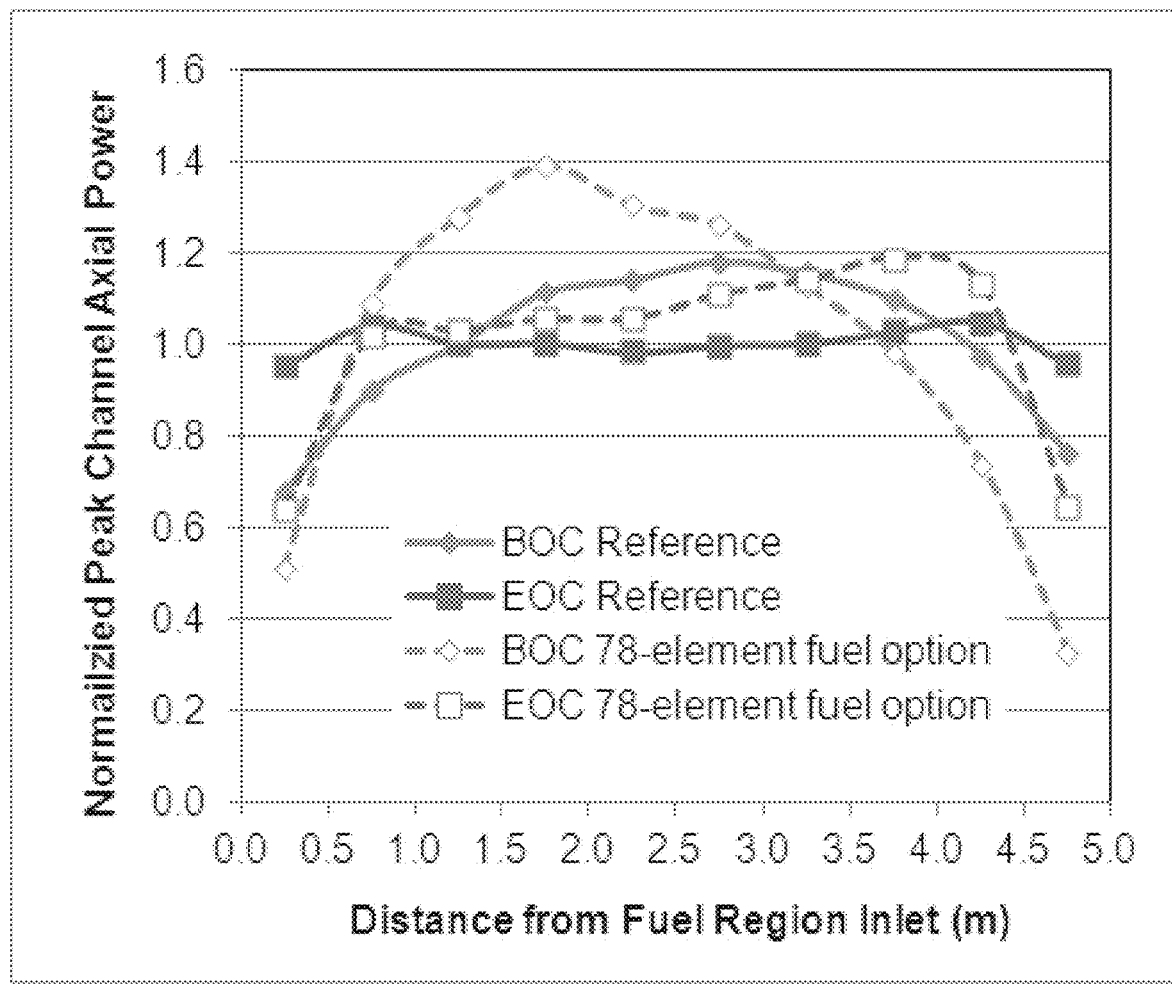
FIG. 7 is a graph of normalized axial power profiles.
Figure 8A:
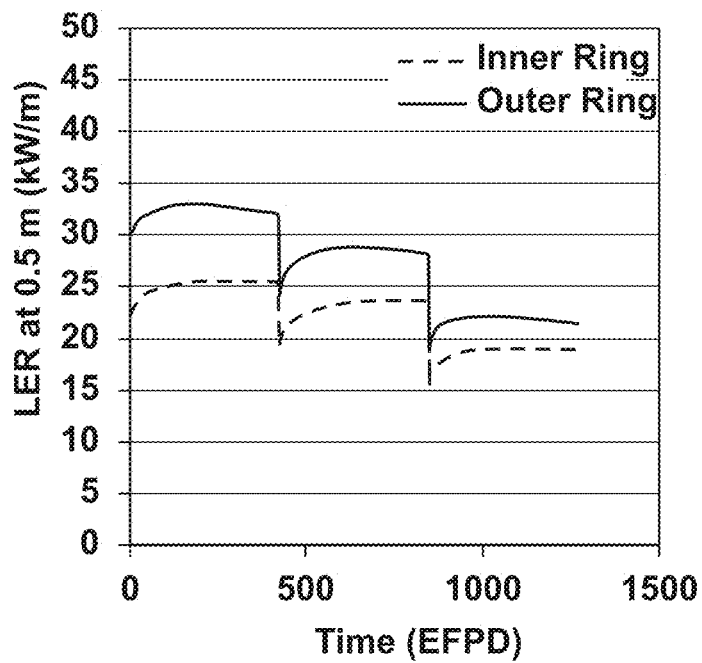
FIGS. 8A, 8B, 8C, 8D and 8E are graphs of linear element ratings (LER) for the inner and outer rings of fuel elements.
Figure 8B:
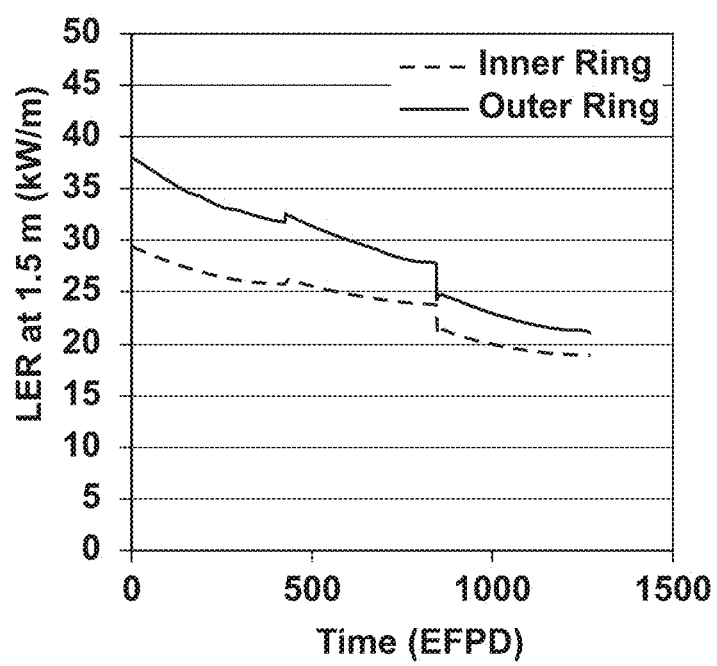
Figure 8C:
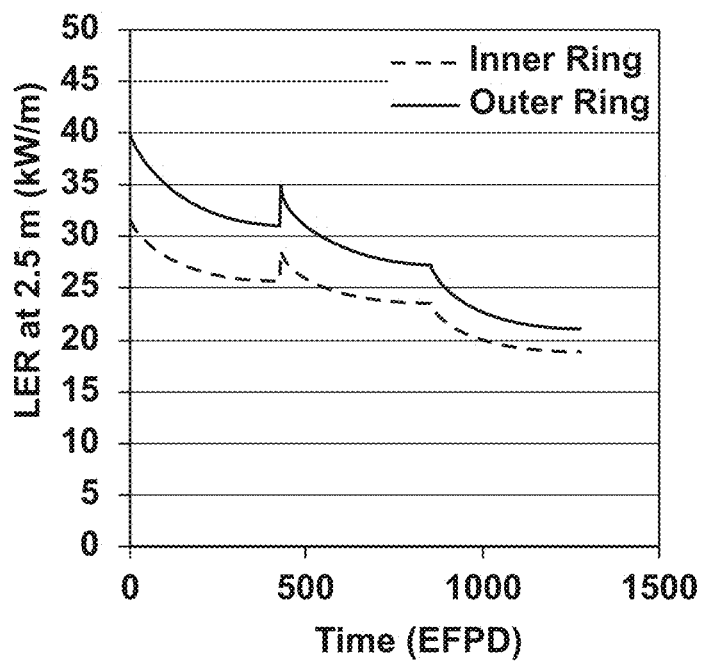
Figure 8D:
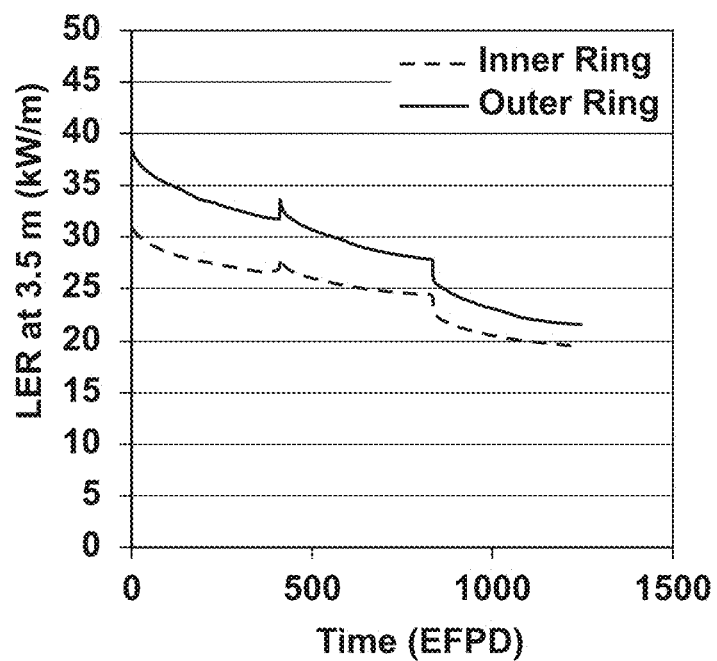
Figure 8E:
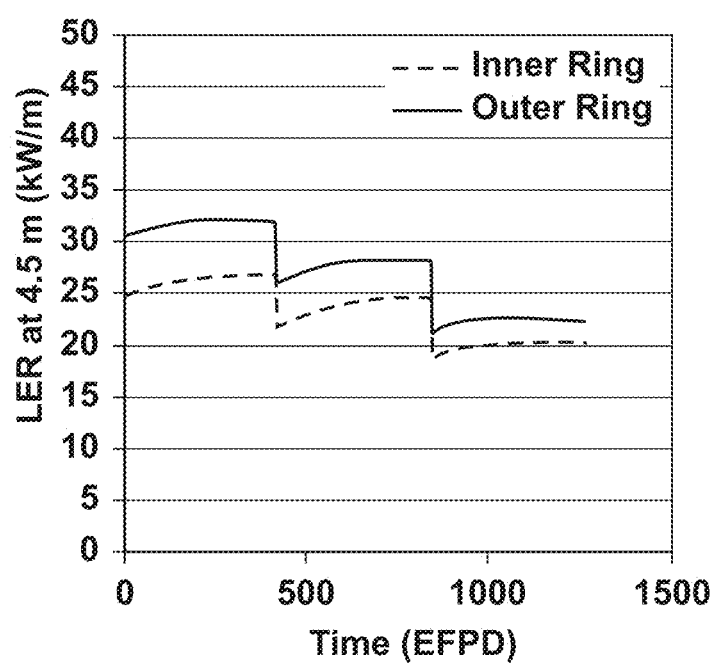

The normalized axial power profiles for BOC and EOC for the peak power channel are plotted in FIG. 7. The power profile at BOC is slightly asymmetric, with a maximum located approximately 3 m from the bottom of the fuel assembly. At EOC, the axial power profile is symmetric, with maxima located at approximately 0.5 m above the bottom of the fuel assembly and 0.5 m below the top of the fuel assembly. Comparison of the BOC and EOC axial profiles shows that there is a flattening of the power profile over time. This power flattening may be a result of the compensatory effect of reactivity on neutron leakage. At BOC, the distribution of fissile material is axially uniform. The power is higher toward the center of the fuel channel because of neutron leakage at the top and bottom of the channel. The higher power in the center of the channel at BOC may result in a higher rate of depletion of fissile material in this region and simultaneous higher production of neutron absorbing fission products. The depletion of fissile material in the center of the channel and buildup of fission products then may lead to a decrease in power toward the center of the channel relative to the ends, resulting in a flattening of the power profile, which is seen at EOC.

Previous results obtained for the 78-element fuel assembly are also plotted in FIG. 7. The present design with 62-elements shows a significant reduction in axial power peaking compared with the previous design at both the BOC and EOC. In addition, the asymmetry in the axial power shape previously observed with the 78-element fuel assembly appears to be absent for the present design. The axial power profiles for the present design therefore show significant improvement over the previous design.

The power history of the fuel assembly in the peak power channel was extracted from a calculation, and used in subsequent calculations to obtain the fuel element power distribution as a function of time and axial location along the fuel channel assembly. The resultant linear element ratings (LER) for the fuel elements in the inner and outer rings are plotted as a function of time and at various axial locations in FIGS. 8A, 8B, 8C, 8D and 8E (the distances refer to distances from the bottom of the fuel assembly.). The abrupt changes in LER at 425 equivalent full power days (EFPD) and 850 EFPD correspond to the change in channel power when the fuel assembly is moved to a new channel position during refueling.

The maximum LER is approximately 40 kW/m, and occurs in the outer fuel ring, at the BOC, near the center of the fuel channel. The maximum LER occurs at the same time and location as the highest reactivity and highest channel power during the cycle. The largest difference in LER between the inner and outer fuel rings occurs at the BOC, is approximately 10 kW/m and decreases over the fuel cycle. A larger variation in the differences in LER between the fuel rings was observed previously with the reference design.

The relative radial power distributions for the present 62-fuel element design are shown in Table 3. For the present design, the relative power densities are nearly the same for the inner and outer ring, within 3% at BOC and within 7% at EOC, and the outer ring produces about 10% more total power than the inner ring both at BOC and EOC. The even power density distribution between the inner and outer ring may ensure an even burnup distribution of the fuel (e.g., exit burnups of approximately 65 MWd/kg and 62 MWd/kg, respectively, for the inner and outer fuel rings at 2.5 m distance from the fuel channel bottom).

TABLE 3

Relative radial power distributions at BOC and EOC.

| Distance from fuel region inlet (m) | Relative Power Densities | | Relative Power Per Ring | |
|---|---|---|---|---|
| | Inner Ring | Outer Ring | Inner Ring | Outer Ring |
| Beginning of Cycle | | | | |
| 0.5 | 0.9722 | 1.0221 | 0.431 | 0.569 |
| 1.5 | 0.9818 | 1.0145 | 0.435 | 0.565 |
| 2.5 | 0.9983 | 1.0013 | 0.443 | 0.557 |
| 3.5 | 1.0062 | 0.9950 | 0.446 | 0.554 |
| 4.5 | 1.0086 | 0.9932 | 0.447 | 0.553 |

TABLE 3-continued

Relative radial power distributions at BOC and EOC.

| Distance from fuel region inlet (m) | Relative Power Densities | | Relative Power Per Ring | |
|---|---|---|---|---|
| | Inner Ring | Outer Ring | Inner Ring | Outer Ring |
| End of Cycle | | | | |
| 0.5 | 1.0415 | 0.967 | 0.463 | 0.537 |
| 1.5 | 1.0591 | 0.953 | 0.471 | 0.529 |
| 2.5 | 1.0652 | 0.948 | 0.473 | 0.527 |
| 3.5 | 1.068 | 0.9459 | 0.475 | 0.525 |
| 4.5 | 1.0686 | 0.9454 | 0.475 | 0.525 |

The flattening of the relative fuel element power densities and burnup profile in the 62-fuel element design may be considered a significant improvement over the previous 78-element fuel assembly. The fuel performance (e.g., thermal conductivity and fission gas retention) may deteriorate as a function of burnup. An even power and burnup distribution within the fuel rings therefore may result in improved fuel performance, as compared to one that favors burnup in the outer fuel ring. Local variations in peak fuel and cladding temperatures may correlate with variations in radial power distribution. An even power distribution between fuel rings which does not change significantly over time may result in an improved temperature distribution in which temperatures are relatively uniform and are unlikely to vary over the cycle.

E. Conclusions

While some changes in the design of the fuel bundle 10 and fuel channel assembly 12 relative to the previous 78-element fuel assembly had a negative impact on the lattice physics (e.g., decrease in reactivity and positive increase in CVR), a net gain in the lattice physics performance appears possible. The light water coolant in the central flow passage 20 may play a significant role as a moderator. The moderation of neutrons in the central flow passage 20 may result in a significant increase in lattice reactivity and fissile utilization, but also may drive the infinite lattice and core CVR to be large and negative. The magnitude of the CVR may be reduced by reducing the flow area, volume or density of coolant in the central flow passage 20. Using core physics modeling, features of the design were found to result in significant improvements, including gains in exit burnup and fissile utilization and reductions in channel and axial power peaking factors.

2. Thermalhydraulics Analysis

A. Modeling Codes

The peak cladding temperature may be the limiting thermalhydraulic parameter for fuel bundles for the Canadian SCWR, and may be calculated using software modeling under different conditions (e.g., modifications to geometry of the fuel bundle and the fuel channel assembly, beginning of cycle (BOC), and end of cycle (EOC)) based on power distributions obtained from modeling codes.

In particular, a computer code has been developed to model subchannel flow and phase distribution in a horizontal pressurized heavy water reactor (PHWR). The code has been designed to be general enough to accommodate other geometries and orientations. These include single subchannels of different shapes, and multiple subchannels of PHWR, pressurized water reactor (PWR) and BWR designs, in both vertical and horizontal orientations. As well, the code may accommodate a range of fluids, including single- and two-phase heavy water, light water, various Freons, and two-phase air-water.

The code has been enhanced to meet the specific requirements for the thermalhydraulic analysis of two-phase flow in the horizontally oriented CANDU (CANada Deuterium Uranium) fuel. The numerical method may model unidirectional axial flow and bi-directional transverse flow. However, the numerical solution is limited to modeling flow structures in which the axial flow is dominant with respect to the lateral flow. This prohibits the code from modeling very low axial flow, stagnant flow or axial flow reversals. This limitation has led to the development of a new staggered grid numerical solution scheme based on a pressure-velocity algorithm. This newer version of code has been used successfully for recirculating flows.

The code version for analysis of the Canadian SCWR includes modifications used to add three heat transfer correlations and water properties for supercritical conditions. This version handles only single-phase calculations, and therefore the transition between two-phase to single-phase or vice-versa is not allowed.

It should be noted that in this analysis the appendages or devices to hold the bundle array and elements are not modeled. The changes to flow distribution resulting from the inclusion of appendages and grid spacers may be exploited, for example by enhancing turbulence, and/or diverting the flow from the inner ring to the middle and outer subchannels, which may reduce the subchannel coolant temperature, thus further reducing the maximum wall temperature.

B. Fuel Assembly Description

As described above with reference to FIGS. 1A and 1B, the fuel channel assembly 12 has a re-entrant or double flow pass configuration. Light water coolant flows from an inlet plenum into the central flow passage 20 located in the inner conduit 14. Bottom ends of the outer conduit 16 are sealed, so that when the coolant reaches the bottom of the central flow passage 20 it is redirected upward and flows through the fuel bundle chamber 18 containing the fuel bundle 10.

The insulator 24 may be arranged between the fuel bundle chamber 18 and the outer conduit 16, and may be supported on either side by liner tubes 26a, 26b. If the insulator 24 were to crack, the encapsulation by the liner tubes 26a, 26b may ensure that any resultant loose insulator material is not transported by the coolant in the fuel bundle chamber 18.

One of the safety features of the Canadian SCWR is the passive removal of long term decay heat through the moderator during postulated loss of coolant accidents. Passive decay heat removal occurs through heat transferred to the moderator. Thus, the insulator 24, while minimizing heat transfer to the outer conduit 16 and the moderation region 22 during normal operating conditions, may allow sufficient heat transfer during postulated accident conditions to ensure long term decay heat removal. Design of the insulator 24 may therefore satisfy criteria for passive long term decay heat removal, with the compromise that subcooling of the moderation region 22 may be required during normal operating conditions.

The Canadian SCWR is intended to operate at 25 MPa, with a coolant inlet temperature of 350° C. and outlet average temperature of 625° C.

Again, exemplary geometric and material specifications for the fuel bundle 10 and the fuel channel assembly 12 are given above in Table 1.

As described herein, in comparison to previous designs, the cross sectional area of the central flow passage 20 is relatively large, for example, in comparison with the 78-element fuel assembly. This may result in a better neutron moderation in the inner conduit 14 caused by the coolant flowing through the central flow passage 20. The fuel bundle 10 has two rings and each one holds thirty one fuel elements 28a, 28b per ring, thus having sixty two fuel elements in total. This configuration may have the following advantages: (i) better neutron moderation close to the inner conduit 14 which may result in a more uniform radial power distribution; (ii) discretization of the fuel bundle 10 may be done using only three types of subchannels (space between adjacent fuel elements), namely inner, intermediate and outer; and (iii) a consistent type of subchannels.

C. Comparative Assessment

A comparison with the previous 78-element fuel assembly is presented herein as part of the assessment of the performance of the 62-element fuel bundle. Parameters for both bundle designs are presented in Table 4.

TABLE 4

Geometrical and thermalhydraulic parameters.

| Geometry | 78-element | 62-element |
|---|---|---|
| Number of rings (containing fuel) | 3 | 2 |
| Number of elements per ring | 15/21/42 | 31/31 |
| Element diameter (mm) | 13.6/13.6/8.2 | 9.5/10.0 |
| Flow tube diameter (mm) | 57.6 | 91.2 |
| Liner internal diameter (mm) | 136 | 144 |
| Fuel volume per bundle (m$^3$) | 3.7 × 10$^{-2}$ | 2.3 × 10$^{-2}$ |
| Total hydraulic diameter (mm) | 5.54 | 7.26 |
| Thermalhydraulic parameters BOC/EOC | 78-element | 62-element |
| Power | 10103.0/7424.4 | 9925.7/9274.3 |
| Averaged AFD Peak | 1.2308/1.1200 | 1.1643/1.0038 |
| Maximum Wall Temperature | 1265/992 | 835.1/841.6 |

The comparative analysis is performed using modeling code with the Jackson heat transfer correlation for supercritical conditions, the Carlucci mixing model and the flow resistance correlation of Colebrook-White. Comparisons are made under conditions corresponding to the beginning of cycle (BOC) and end of cycle (EOC). This set of model options is hereafter called the base case.

D. Radial Power Distribution

The relative radial power distributions for the current 62-element fuel option, and the previous 78-element fuel assembly are provided above in Table 3. The even power density distribution between the inner and outer rings may help in reducing hot spots within the fuel bundle 10. This, in combination with uniformity of fuel element diameters and consistent subchannel sizes, may result in lower wall temperatures.

E. Axial Power Distribution

Figure 9:
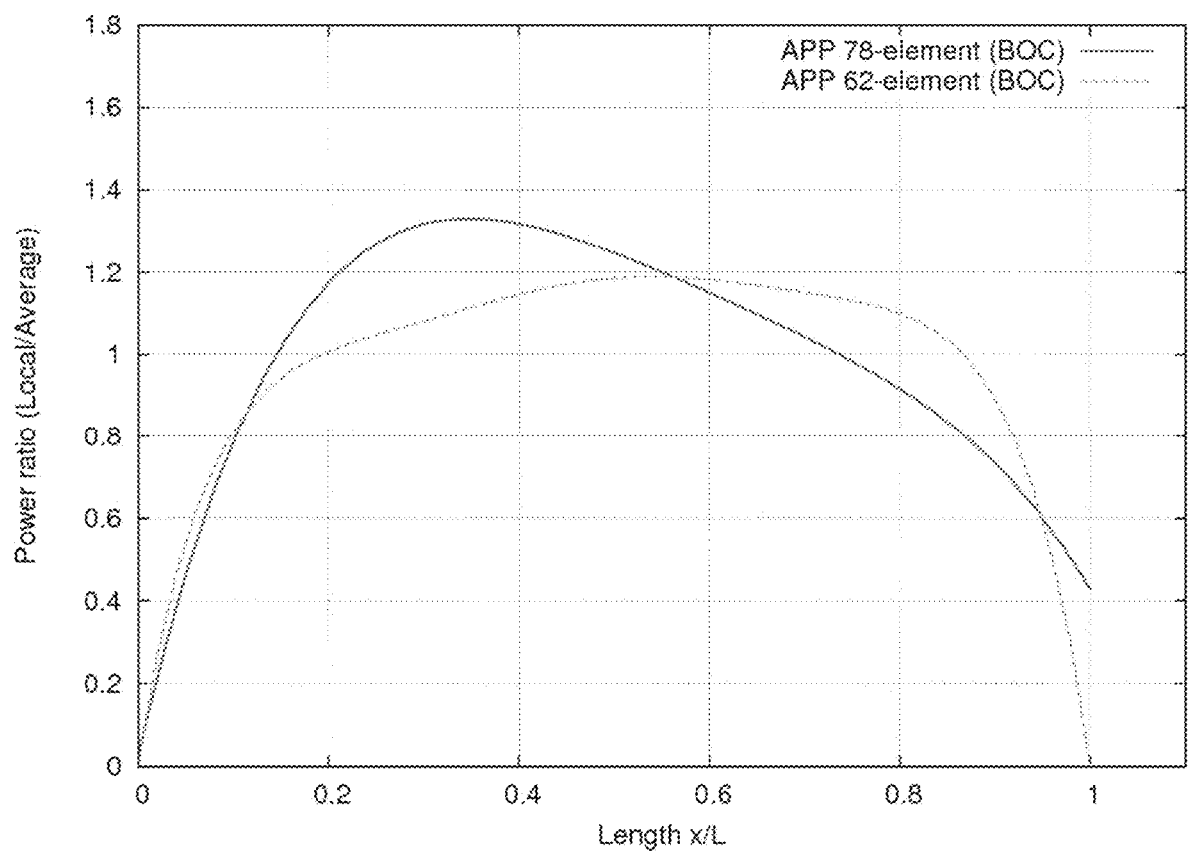
FIGS. 9 and 10 are graphs of axial power profiles.
Figure 10:
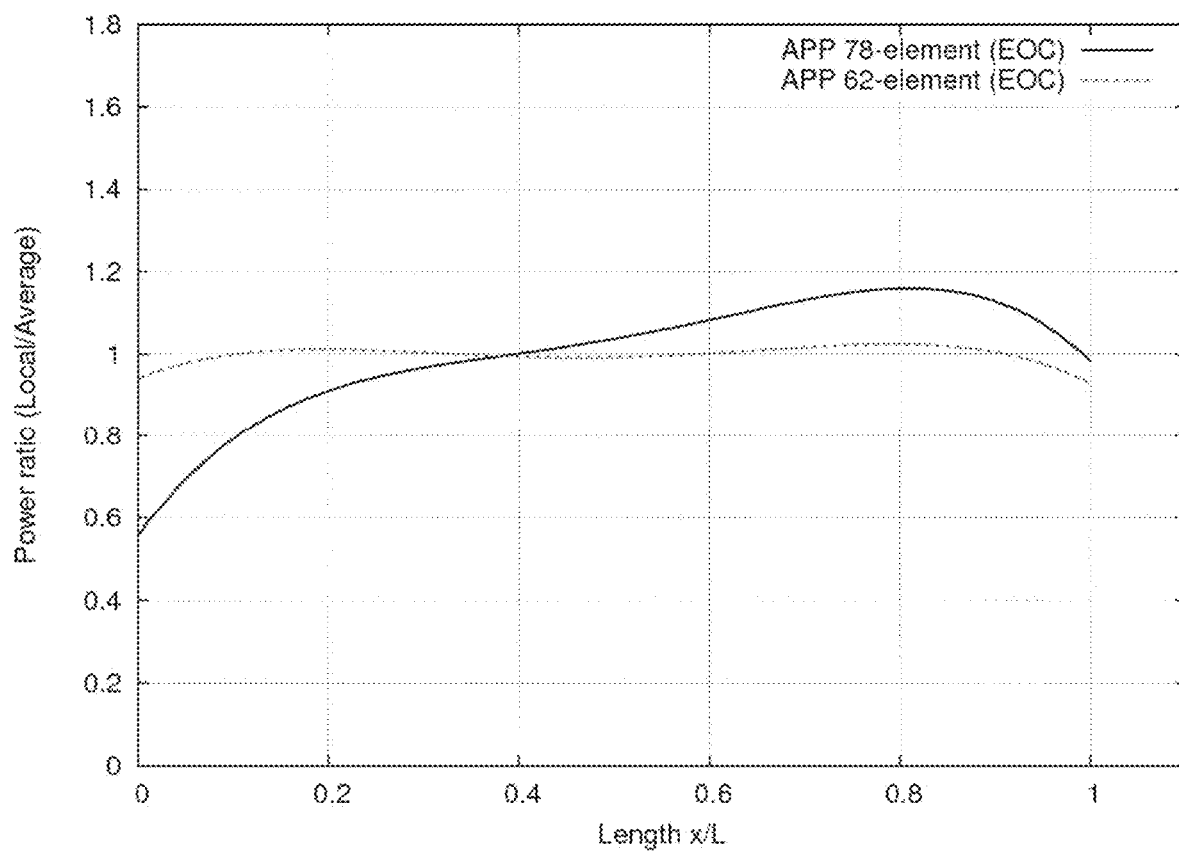

Referring to FIGS. 9 and 10, the axial power distribution may be directly related to the axial location of the maximum wall temperature. For instance, a cosine shape profile may lead to a maximum wall temperature downstream of the peak distribution. A flat power distribution may tend to result in a maximum wall temperature at the end of the fuel bundle.

F. Average Outlet Temperature and Maximum Wall Temperature

The wall temperature and coolant temperature may be directly related. In fact, a uniform cross sectional coolant temperature distribution may give the lowest maximum wall temperature for any arbitrary geometrical arrangement of fuel pins, whereas a non-uniform may result in higher wall temperatures. The following temperature distribution analysis is performed using the outlet conditions (i.e. at 500 cm).

The cross sectional temperature distributions were determined for both the fuel bundle 10 and the fuel channel assembly 12 of the present disclosure, and the previously investigated 78-element fuel assembly.

Figure 11:
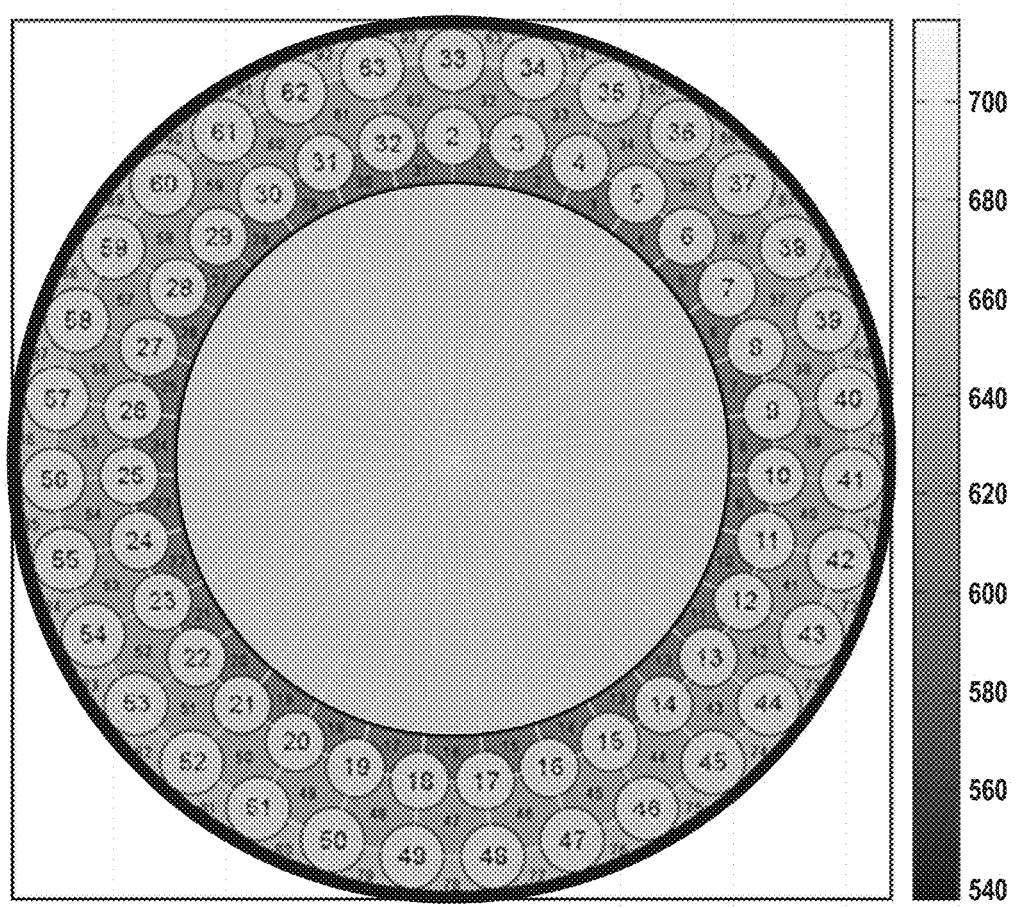
FIGS. 11 and 12 are diagrams of coolant temperature distribution.
Figure 12:
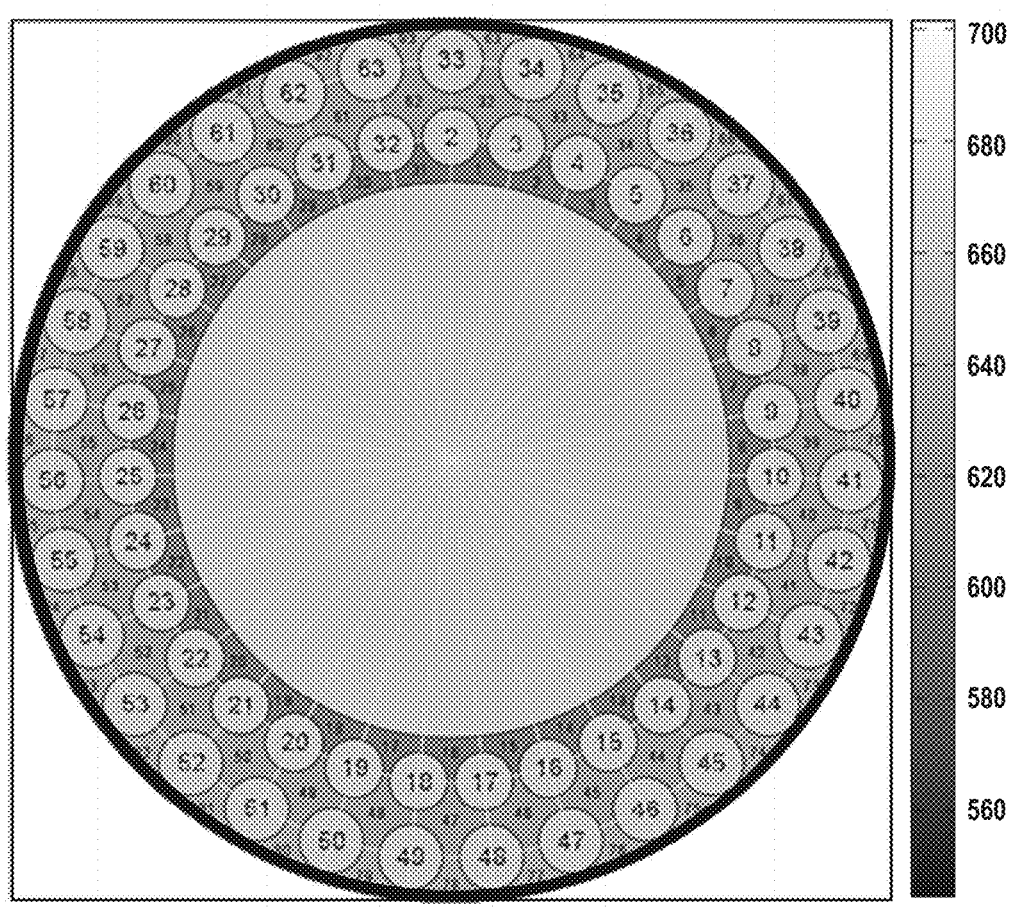

The BOC and EOC temperature distributions for the 62-element fuel assembly are shown in FIGS. 11 and 12, respectively. The coolant temperature ranges from 597° C. to 651° C. for the BOC, and 605° C. to 638° C. for the EOC. The inner subchannels are the coldest and correspond to a flow tube wall temperature of ~600° C. Lower temperatures may occur in this area because the inner conduit 14 does not generate heat. The intermediate and outer subchannel coolant temperatures are within 20° C. of the average radial temperature. The coolant temperature increases in moving from the inner to the outer subchannels.

In contrast to the 62-element fuel assembly, the 78-element fuel assembly has four subchannel rings, the inner, inner intermediate, outer intermediate and outer subchannels. Similar to the 62-element, the lowest temperature is located in the inner ring and increases towards the outer ring. However, the coolant temperature ranges from 401° C. to 1141° C. for the BOC, and 452° C. to 777° C. for the EOC. The significant difference between the minimum and maximum temperatures may be due to the non-uniform radial heat flux distribution combined with uneven subchannel sizes (thus resulting in different subchannel mass flows).

Based on these results, uniform heat flux distributions may help to reduce hot spots in the subchannels. (This may be achieved with a uniform radial power profile and equal fuel element heated perimeter). Furthermore, because the flow tube does not generate heat, the inner subchannels may tend to be the coolest.

G. Sensitivity Analysis

The supercritical heat transfer correlations available in the modeling code were used to assess their impact on wall temperature predictions. The results are presented in Table 5.

TABLE 5

Sensitivity analysis results.

| Case | Max wall temp. (° C.) | Rod # | Sub Channel # | Axial Location (cm) |
|---|---|---|---|---|
| Beginning of Cycle | | | | |
| Base Case | 835.1 | 33 | 63 | 430-440 |
| Base Case + Dittus-Boelter | 791.9 | 33 | 63 | 440-450 |
| Base Case + Bishop | 867.2 | 33 | 63 | 420-430 |
| Base Case + Mokry (Modified Bishop) | 918.1 | 33 | 63 | 410-420 |
| Base Case + Offset inner ring angle by 5.6 degrees | 850.6 | 33 | 94 | 430-440 |
| Base Case with 32 elements per ring | 792.3 | 34 | 97 | 430-440 |
| End of Cycle | | | | |
| Base Case | 841.6 | 33 | 63 | 480-490 |
| Base Case + Dittus-Boelter | 805.4 | 33 | 63 | 480-490 |
| Base Case + Bishop | 868.9 | 33 | 63 | 480-490 |
| Base Case + Mokry (Modified Bishop) | 907.9 | 33 | 63 | 480-490 |
| Base Case + Offset inner ring angle by 5.6 degrees | 834.9 | 33 | 94 | 480-490 |
| Base Case with 32 elements per ring | 842.8 | 2 | 1 | 480-490 |

The results show that the code predicted the lowest wall temperature, using the Dittus-Boelter correlation, which gave temperatures that were approximately 30 to 40° C. lower than the base case. The Bishop correlation resulted in wall temperatures about 30° C. higher than the base case. The Mokry correlation resulted in the highest wall temperature predictions, over 80° C. for the BOC and 30° C. for the EOC compared to the base case.

The sensitivity to element arrangement and number of fuel elements was also examined. An angular offset between the inner and outer ring may result in a change in the size and shape of both the inner and outer subchannels, which would result in a potential redistribution of the radial heat power distribution. Increasing the number of fuel elements in each ring may decrease the power per fuel element, and therefore may reduce the wall temperature. However, due to geometrical constraints, increasing the number of fuel elements may result in a reduction in the total fuel mass, thus increasing the power density, potentially counteracting the advantage of lower power per fuel element.

To investigate the potential benefits and impacts of varying the offset of the rings, and/or increasing the number of fuel elements in the inner and outer rings, two more cases were analyzed: a 62-element fuel assembly in which the inner ring of fuel elements was offset by 5.62°; and 64-element fuel assembly with the same offset. The results from analysis of these cases are also presented in Table 5 above. The inclusion of an angular offset of the inner ring in the 62-element fuel assembly resulted in an increase of the maximum wall temperature of 15° C. for the BOC and a decrease of 7° C. for the EOC. In addition, the location of the maximum wall temperature shifted from the outer to the intermediate subchannel. The introduction of an additional fuel pin in each ring, i.e., the 64-element fuel assembly, results in a reduction of 40° C. in the peak wall temperature for the for the BOC, and an insignificant change for the EOC. As was observed in the previous case, the maximum wall temperature shifted to the inner ring. The reasons for these changes may be new power distributions combined with smaller element diameters.

H. Conclusions

The flattening of the power distribution profile in the 62-element fuel assembly may result in a significant improvement in performance over the previous 78-element fuel assembly. The even power distribution within the rings of the fuel elements may result in lower wall temperatures compared to one that has a non-uniform power distribution, because local variations in peak fuel and cladding temperatures generally correlate with variations in radial power distribution. Because the even power distribution between the rings of the fuel elements may not change significantly over time, the improvement in temperature distribution may also be unlikely to vary over the cycle.

Subchannel geometry may be important for the 62-element fuel assembly. The reduction to the two rings of the fuel elements 28a, 28b (compared to three, for example) in combination with a relatively large central moderating region (the central flow passage 20) may enable a more balanced heat transfer and coolant mass flow within the subchannels. This improved balance in heat transfer and coolant mass flow, in turn, may enable lower achievable wall temperatures. In addition, the design of the fuel bundle 10 may enable flexibility that may be exploited for further improvement. For instance, further modifications to the fuel bundle 10 via an offset of the rings and change in sizes of the fuel elements may enable a further decrease in the maximum wall temperature and linear power rating, although at the expense of reduced total fuel mass.

While the above description provides examples of one or more processes or apparatuses, it will be appreciated that other processes or apparatuses may be within the scope of the accompanying claims.

We claim:

1. A fuel assembly for a pressure-tube nuclear reactor, comprising:
    a fuel channel assembly comprising:
        an outer conduit having an open upper end and a closed lower end that is spaced apart from the upper end along a fuel channel assembly axis;
        an inner conduit received within the outer conduit and having an inner upper end, an inner lower end axially spaced apart from the inner upper end and disposed toward the lower end of the outer conduit and a central flow passage extending between the inner upper end and inner lower end for receiving a flow of a coolant in one direction;
        an annular fuel bundle chamber defined between the outer conduit and the inner conduit, wherein the coolant exiting the inner lower end is redirected by the closed lower end of the outer conduit to flow through the annular fuel bundle chamber in an opposite direction; and
    a fuel bundle positioned within the fuel bundle chamber, the fuel bundle comprising a plurality of fuel elements, and consisting of an inner ring of inner fuel elements surrounding the inner conduit, and an outer ring of outer fuel elements surrounding the inner ring, wherein the fuel elements of the inner ring have a smaller axial cross sectional area than the fuel elements of the outer ring.

2. The fuel assembly of claim 1, wherein a first ratio of a cross sectional area of the coolant in the fuel bundle chamber and the central flow passage to a cross sectional area of the fuel elements is between approximately 2.6 and 7.5.

3. The fuel assembly of claim 1, wherein a second ratio of a cross sectional area of the coolant in the central flow passage to a cross sectional area of the coolant in the fuel bundle chamber is between approximately 0.8 and 1.3.

4. A nuclear reactor comprising a plurality of the fuel assemblies according to claim 1 arranged in a lattice, wherein a moderator region laterally surrounds the outer conduit of each of the fuel assemblies, the moderator region retaining a moderator therein.

5. The fuel assembly of claim 1, wherein the inner and outer conduits have generally circular axial cross sectional shapes.

6. The fuel assembly of claim 5, wherein the central flow passage is laterally surrounded by the fuel bundle.

7. The fuel assembly of claim 6, wherein a central axis of the central flow passage is laterally centered relative to the fuel bundle.

8. The fuel assembly of claim 7, wherein the fuel bundle is rotationally symmetrical about the central axis.

9. The fuel assembly of claim 8, wherein the fuel elements of the inner ring are positioned along a first common circumference about the central axis, and the fuel elements of the outer ring are positioned along a second common circumference about the central axis that is concentric with and laterally outboard of the first common circumference.

10. The fuel assembly of claim 9, wherein a number of the fuel elements in the inner ring is equal to a number of the fuel elements in the outer ring.

11. The fuel assembly of claim 10, wherein a subchannel distance between each of the fuel elements in the inner ring and the corresponding adjacent one of the fuel elements of the outer ring is approximately equal to a subchannel distance between each of the fuel elements in the inner ring.

12. The fuel assembly of claim 9, wherein the fuel elements have generally circular axial cross sections.

13. The fuel assembly of claim 9, wherein axial cross sectional areas of each of the fuel elements in the inner ring are different than axial cross sectional areas of each of the fuel elements in the outer ring.

14. The fuel assembly of claim 1, wherein the fuel channel assembly comprises an insulator that is positioned radially intermediate of the fuel bundle chamber and the outer conduit.

15. The fuel assembly of claim 14, wherein the insulator is encapsulated between inner and outer liner tubes, the outer liner tube being arranged along an interior surface of the outer conduit.

16. The fuel assembly of claim 15, wherein the insulator is formed of a solid material.

17. The fuel assembly of claim 16, wherein the inner and outer liner tubes are formed of different materials.

18. A fuel assembly for a pressure-tube nuclear reactor, the fuel assembly comprising:
   a fuel channel assembly comprising an outer conduit, an inner conduit received within the outer conduit and defining an annular fuel bundle chamber therebetween for receiving a flow of coolant in one direction, the inner conduit comprising a central flow passage for receiving a flow of the coolant in an opposite direction; and
   a fuel bundle positioned within the fuel bundle chamber, the fuel bundle comprising a plurality of fuel elements, wherein both of the following conditions are satisfied:
   (i) a first ratio of a cross sectional area of the coolant in the fuel bundle chamber and the central flow passage to a cross sectional area of the fuel elements is between approximately 2.6 and 7.5; and
   (ii) a second ratio of a cross sectional area of the coolant in the central flow passage to a cross sectional area of the coolant in the fuel bundle chamber is between approximately 0.8 and 1.3.

19. A pressure-tube nuclear reactor, comprising:
   a plurality of fuel assemblies arranged in a lattice, each of the fuel assemblies comprising
      a fuel channel assembly comprising an outer conduit, an inner conduit received within the outer conduit and defining an annular fuel bundle chamber therebetween receiving a flow of a coolant liquid at a coolant pressure and in one direction, the inner conduit comprising a central flow passage receiving a flow of the coolant liquid in an opposite direction, and
      a fuel bundle positioned within the fuel bundle chamber, the fuel bundle comprising a plurality of fuel elements; and
   a moderator region laterally surrounding the outer conduit of each of the fuel assemblies, the moderator region retaining a liquid moderator therein, the liquid moderator being fluidly isolated from the coolant liquid and being at a moderator pressure that is less than the coolant pressure;
   wherein at least one of the following conditions is satisfied:
   (i) a first ratio of a cross sectional area of the moderator in the moderator region to a cross sectional area of the fuel elements is between approximately 10 and 20; and
   (ii) a second ratio of a cross sectional area of the moderator in the moderator region to a cross sectional area of the coolant in the fuel bundle chamber and the central flow passage is between approximately 2.7 and 3.7.

* * * * *